(12) United States Patent
Anthapadmanabhan et al.

(10) Patent No.: US 9,729,360 B2
(45) Date of Patent: Aug. 8, 2017

(54) METHOD AND APPARATUS FOR PROCESSING BIT-INTERLEAVED DATA TRAFFIC IN A COMMUNICATION NETWORK

(71) Applicants: Nagaraj Prasanth Anthapadmanabhan, Bridgewater, NJ (US); Dusan Suvakovic, Pleasanton, CA (US); Hungkei Keith Chow, Livingston, NJ (US); Doutje T. Van Veen, New Providence, NJ (US)

(72) Inventors: Nagaraj Prasanth Anthapadmanabhan, Bridgewater, NJ (US); Dusan Suvakovic, Pleasanton, CA (US); Hungkei Keith Chow, Livingston, NJ (US); Doutje T. Van Veen, New Providence, NJ (US)

(73) Assignee: Alcatel Lucent, Boulogne-Billancourt (FR)

( * ) Notice: Subject to any disclaimer, the term of this patent is extended or adjusted under 35 U.S.C. 154(b) by 187 days.

(21) Appl. No.: 13/853,754

(22) Filed: Mar. 29, 2013

(65) Prior Publication Data

US 2014/0126919 A1    May 8, 2014

Related U.S. Application Data

(60) Provisional application No. 61/617,410, filed on Mar. 29, 2012.

(51) Int. Cl.
*H04L 25/03* (2006.01)
*H04L 1/00* (2006.01)

(52) U.S. Cl.
CPC ...... *H04L 25/03866* (2013.01); *H04L 1/0071* (2013.01)

(58) Field of Classification Search
None
See application file for complete search history.

(56) References Cited

U.S. PATENT DOCUMENTS

| | | | |
|---|---|---|---|
| 6,195,414 B1* | 2/2001 | Simmons et al. | 379/22 |
| 6,662,332 B1* | 12/2003 | Kimmitt | 714/762 |
| 2006/0093023 A1* | 5/2006 | Brown | H04L 27/263 375/219 |
| 2009/0044231 A1* | 2/2009 | Oh | H03M 13/271 725/62 |
| 2012/0076234 A1* | 3/2012 | Kim et al. | 375/295 |

* cited by examiner

*Primary Examiner* — Michael D Yaary
(74) *Attorney, Agent, or Firm* — Stephen J. Wyse

(57) ABSTRACT

A manner of processing bit-interleaved data traffic in a communication network. In the increasingly-common scenario where data traffic is bit interleaved and scrambled using a PRBS (pseudo-random binary sequence) before it is transmitted from a sender to a receiver, the receiver is configured to receive the transmitted bit stream and decimate it, that is, remove the bits of the bit stream that are allocated for the receiver, prior to descrambling. To accomplish this, the receiver employs an LFSR (linear feedback shift register) similar or identical to the one used by the sender to scramble the data. The LFSR is initialized by employing helper bits inserted by the sender or an initialization unit, and may employ other techniques for phase adjustment or state skipping depending on the nature of the transmitted bit stream.

22 Claims, 16 Drawing Sheets

PHASE SHIFT OF THE DECIMATED MLS w.r.t. THE ORIGINAL MLS CORRESPONDING TO EACH RECEIVER FOR THE CASE WHERE THE SCRAMBLING POLYNOMIAL IS $1+x^6+x^7$ AND SCRAMBLER INITIAL STATE IS ALL 1s

PHASE SHIFT OF THE DECIMATED MLS w.r.t. THE ORIGINAL MLS CORRESPONDING TO EACH RECEIVER FOR THE CASE WHERE THE SCRAMBLING POLYNOMIAL IS $1+x^6+x^7$ AND THE SCRAMBLER INITIAL STATE IS $[0, 0, ..., 0, 1]$

PHASE SHIFT OF THE DECIMATED MLS w.r.t THE ORIGINAL MLS CORRESPONDING TO EACH RECEIVER FOR THE CASE WHERE THE SCRAMBLING POLYNOMIAL IS $1+x^{18}+x^{23}$ AND THE SCRAMBLER INITIAL STATE IS ALL 1s

PHASE SHIFT OF THE DECIMATED MLS w.r.t. THE ORIGINAL MLS CORRESPONDING TO EACH RECEIVER FOR THE CASE WHERE THE SCRAMBLING POLYNOMIAL IS $1+x^{18}+x^{23}$ AND THE SCRAMBLER INITIAL STATE IS $[0,0, ..., 0,1]$

METHOD AND APPARATUS FOR PROCESSING BIT-INTERLEAVED DATA TRAFFIC IN A COMMUNICATION NETWORK

CROSS-REFERENCE TO RELATED APPLICATIONS

The present disclosure is related to and claims priority from U.S. Provisional Patent Application Ser. No. 61/617,410, entitled Methods for Efficient Descrambling of Bit-Interleaved Traffic and filed on 29 Mar. 2012, the entire contents of which are incorporated by reference herein.

TECHNICAL FIELD

The present invention relates generally to the field of communication networks, and, more particularly, to a method and apparatus for handling data communications traffic that is bit-interleaved and scrambled for transmission.

BACKGROUND

The following abbreviations are herewith defined, at least some of which are referred to within the following description of the state-of-the-art and the present invention.
IEEE Institute of Electrical and Electronics Engineers
LFSR Linear Feedback Shift Register
MLS Maximal Length Sequence
OLT Optical Liner Terminal
ONU Optical Network Unit
PON Passive Optical Network
PRBS Pseudo-Random Binary Sequence
PtMP Point to Multi Point
PtP Point to Point Communication networks are employed to transmit data from one device to another or from one device to many devices, enabling such services as television, Internet access, and streaming music and videos. Some networks are referred to as access networks, as they provide access for individual subscribers or users to a larger core network where large amounts of data may be transmitted between service providers and the access networks.

Examples of access networks include WiFi (or other short range wireless) networks or "hot spots", cellular telephone networks, and PONs (passive optical networks). WiFi hot spots, for example, enable mobile users with laptops or smart phones to connect with the Internet. Cell phone networks enable voice and other communications to mobile users. PONs use optical fibers to connect subscribers to a communication network, which often provides television, telephone, and Internet service.

Using a PON as an example, an OLT (optical line terminal) located in a service provider central office is typically connected by a feeder fiber to an optical splitter, which splits a downstream optical signal across many access fibers, each access fiber leading to an ONU (optical network unit) at or near the premises of a subscriber (or group of subscribers). Each ONU in this way receives the same downstream signal, but is configured to use only those portions intended for it. Upstream signals from the individual ONUs are sent in the opposite direction. Frequently, different wavelengths are used for downstream and upstream transmission to avoid interference. Each ONU may be given a time slot for upstream transmissions so that these signals do not interfere with each other.

The techniques described generally above are useful because of at least two factors. One, the OLT includes a relatively complex and costly high-speed transmitter, but only one is needed for a great many ONU receivers. Second, there is usually far more information to transmit in the downstream direction than from any individual subscriber upstream to the central office.

The OLT therefore in effect broadcasts transmissions in the downstream direction and each ONU receiver, while essentially receiving the entire broadcast, takes and uses only its own portion. This form of transmission is sometimes referred to as PtMP (point to multipoint). Generally speaking, WiFi access points and cellular network base stations use the same principle when communicating with user equipment via a radio frequency channel. FIG. 1 is a simple schematic diagram illustrating a PtMP network 10. In the example of FIG. 1, the sending device 12 such as an OLT sends a downstream transmission over a transmission medium 14, for example optical fibers, to receivers such as ONUs, here referred to as 16a through 16n (the ellipsis indicating there may be any number). As should be apparent, this network 10 is only PtMP in one (the downstream) direction.

Since PtMP transmissions often must carry signals intended for many receivers, techniques have evolved for how best to transmit this information. One relatively-new method involves bit interleaving. In this technique, a transmission frame may be formed with the first bit of data for each receiver positioned one after the other, then all of the second bits in the same order, and so on. In other cases the interleaving is not regular, and in fact both the start position of the bits for a given receiver and the interval between these bits may vary for each receiver (and from frame to frame). FIG. 2 is an exemplary frame structure 20 illustrating a exemplary bit-interleaved format. The exemplary frame 20 of FIG. 2, begins with a synchronization portion 22; a number of bits that can be used by each receiver to find the beginning of the information-bearing portion of the frame. The header portion 25, which normally contains overhead or administration information, is bit-interleaved. In frame 20, five receivers are addressed, and every fifth bit is intended for a given receiver. For example, the bit 25-1 in the first position is intended for a first receiver, along with bits 25-6 and 25-11, and so on. Bits 25-2, 25-7, 25-12 and so on are for a second receiver (for clarity, only these bits are numbered).

In the header portion 25 of this exemplary frame, the allocation of bits for each respective receiver is typically regular and static. Note that in this context, "regular" means that each receiver has bits occurring at the same interval or decimation factor K in a given frame portion (for example the header or the payload), and the starting position of the allocation is within the first K bits of the relevant portion. "Static" means that this allocation does not vary from frame to frame. The allocation may be static and regular, but this is not always the case for payload portion 30 of frame 20. Payload portion 20, which begins with bit 30-1, carries the actual data intended for each receiver and is formed in a manner similar to that used for the header portion 25. If the allocation of bits in the payload portion 30 is not regular or static, some manner of notifying the receivers how to adjust is undertaken, for example by identifying the variation in the header field. Note that the same technique may be used to send the same information to groups of receivers, with each receiver in the group processing the information intended for the group members.

At the sending device, information intended for each receiver is converted into digital form and transmitted in a series of frames, with each frame being assembled by interleaving the bits from individual receiver bit streams. As should be apparent, the bits intended or "allocated" for each respective receiver are extracted from received frames to form the original bit stream. This process is herein referred to as decimation.

Prior to transmission, the interleaved frames may also be scrambled in an attempt to avoid long sequences of 0s or 1s. Before transmitting, the sender passes the entire frame through a scrambler, for example in PONs where scrambling is used to facilitate clock and data recovery. One scrambling technique employs additive scramblers where a PRBS (pseudo-random binary sequence) is generated using an LSFR (linear feedback shift register), and then added (XOR-ed) with the original bit stream. The original frame can be reconstructed in the receiver, typically using an identical or analogous LFSR arrangement.

While bit interleaving and scrambling may both be advantageously employed, their use together may introduce some inefficiency at the receivers. The sending device normally transmits at a much higher rate of speed than the rate at which the receivers need to accommodate their portion of the traffic. The downstream transmission of course arrives at the receiver at the transmission rate $R_t$, where it is then descrambled and then decimated. Only after decimation, where only the bits intended for the receiver are extracted from the frame, can the remaining elements of the receiver process the bits at a slower rate suitable for the smaller bit stream.

Needed then is a manner of handling bit-interleaved data transmission to enable more efficient processing, especially in the receiver. These needs and other needs are addressed by embodiments of the present invention.

Note that the techniques or schemes described herein as existing or possible are presented as background for the present invention, but no admission is made thereby that these techniques and schemes were heretofore commercialized or known to others besides the inventors.

SUMMARY

The present invention is directed to a manner of processing bit-interleaved data traffic in a communication network. Specifically, the present invention may be used to advantage where bit-interleaved traffic is scrambled using a PRBS (pseudo-random binary sequence). In one aspect, the present invention is a communication system including at least one receiver, where the receiver includes a network interface for receiving an interleaved bit stream that has been scrambled using a PRBS (pseudo-random binary sequence), a decimator downstream of the network interface for extracting from the bit stream the bits allocated for the receiver, and a bit stream descrambler downstream of the decimator for descrambling the allocated bit stream. In some embodiments, the communication system may include a transmitter having a bit stream scrambler, and in that case the bit stream scrambler may include an LFSR. The communication system may also include the transmission medium by which the interleaved bit stream is transmitted to the receiver or receivers. As just one example the communication system may be a PON (passive optical network) with an OLT (optical line terminal) as a sending device and numerous ONUs (optical network units) as receivers. Other examples include wireless communication systems or even chip-to-chip communications.

In some embodiments, the communication system includes a descrambler having m-bit LFSR with a feedback loop, the feedback loop including an XOR gate adder having as a first input the output of the $m^{th}$ register of the LFSR and having as a second input an LFSR tap positioned between the first register of the LFSR and the $m^{th}$ register of the LFSR. In this embodiment, the LFSR feedback loop may but does not necessarily have a plurality of XOR gate adders in series, each XOR gate adder having as a second input an LFSR tap positioned between the first register of the LFSR and the $m^{th}$ register of the LFSR.

In some embodiments the communication system receiver receives a bit-interleaved transmission that has been scrambled by a PRBS that is an MLS (maximal length sequence). In that case the receiver may include a descrambler LFSR with an input selector having as a first input the output of the at least one XOR gate adder and as a second input the allocated bit stream from the decimator, wherein input selector selects the input to the first register of the LFSR. The input selector may be configured to select the second input for the first m bits of the allocated bit stream corresponding to a data frame and to select the first input otherwise. The descrambler may include an output XOR gate adder having as a first input the output of the at least one XOR gate adder and as a second input the allocated bit stream from the decimator, wherein the output of the output XOR gate adder is the descrambled data. The descrambler may also include an output selector having as a first input the output of the $m^{th}$ register of the LFSR and having as a second input the output of the at least one XOR gate adder; and as a second input the allocated bit stream from the decimator, wherein the output of the output XOR gate adder is the descrambled data.

In some embodiments the communication system may include an initialization unit for initializing the LFSR in the receiver. In this case the initialization unit may include state skipping logic. The communication system may also include a phase shifting computation unit.

In another aspect, the present invention is a method of processing bit-interleaved traffic in a communication system including receiving an interleaved bit stream that has been scrambled using a PBRS, decimating the bit stream to extract bits allocated for a receiver, and descrambling the allocated bit stream. The PBRS may in some cases be characterized by an MLS.

In some embodiments, the descrambler has an m-bit LFSR and, if so, the method may further include initializing the LFSR. Initializing the LFSR may be done using helper bits that have been inserted into the interleaved bit stream, or may include loading bits generated by an initialization unit.

Additional aspects of the invention will be set forth, in part, in the detailed description, figures and any claims which follow, and in part will be derived from the detailed description, or can be learned by practice of the invention. It is to be understood that both the foregoing general description and the following detailed description are exemplary and explanatory only and are not restrictive of the invention as disclosed.

BRIEF DESCRIPTION OF THE DRAWINGS

A more complete understanding of the present invention may be obtained by reference to the following detailed description when taken in conjunction with the accompanying drawings wherein.

DETAILED DESCRIPTION

Figure 1:
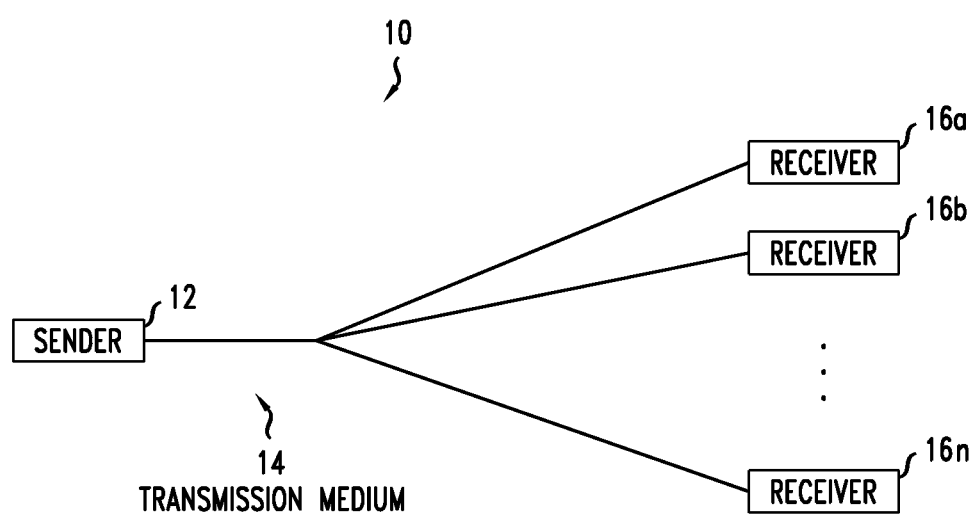
FIG. 1 is a simplified schematic diagram illustrating a P2MP network.

The present invention is directed to a manner of processing bit-interleaved data traffic in a communication network. Specifically, the present invention may be used to advantage where bit-interleaved traffic is scrambled using a PRBS (pseudo-random binary sequence). As mentioned above, bit-interleaved and scrambled data traffic may be advantageously employed in PtMP (point to multi-point) environments, where a single sending unit transmits to multiple receivers that each extract that portion of the data frames that are intended for them. Note, however, that the present invention may be useful and implemented in other environments as well, for example those employing PtP (point to point) communications (which may be viewed as a special case of PtMP).

Although bit interleaving brings some efficiency to a communication environment, it introduces some inefficiencies as well. In the conventional approach, illustrated in FIG. 3, the interleaved and scrambled bit stream 35 is received at the network interface 41 of receiver 40. The received bit stream is then passed to a descrambler 45 where it is descrambled, and the descrambled bit stream 46 is then passed to a decimator 50. Decimator 50 produces a bit stream 55 that includes the bits of the received bit stream 35 that were allocated for receiver 40. The descrambled and de-interleaved bit stream 55 is then passed along for further processing.

Figure 3:
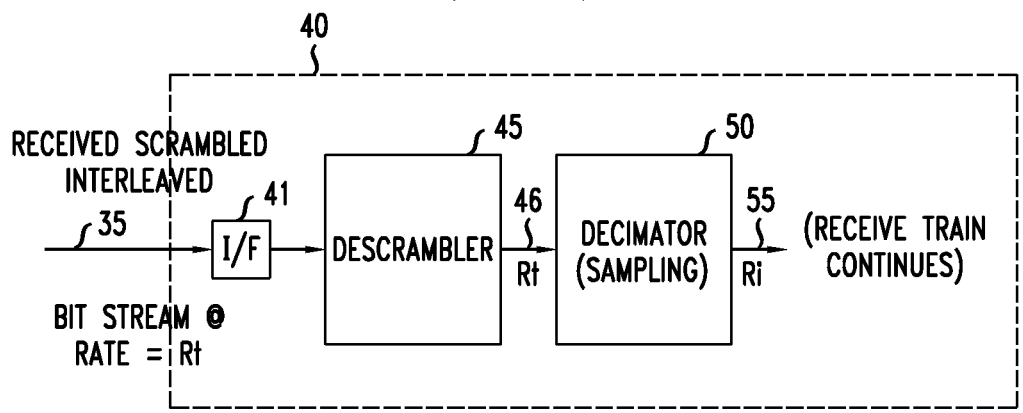
FIG. 3 is a simplified block diagram illustrating selected components of a receiver of the prior art.

As noted in FIG. 3, and as is true in most cases, incoming bit stream 35 is received at the rate of transmission, $R_t$, which not unexpectedly is much faster than the rate $R_i$ of bit stream 55. This means that the descrambler 45 and the decimator 50 must both operate at the higher rate. In addition, the descrambler 45 must process the entire bit stream 35. The remaining elements (not shown) of receiver 40, of course, efficiently process the smaller allocated bit stream 55 at the much slower rate $R_i$.

The inventors have discovered that this efficiency may be extended by proper configuration and operation of the receiver, especially in a PtMP environment where bit interleaving provides advantages. Several embodiments of this configuration will now be described in further detail.

Figure 4:
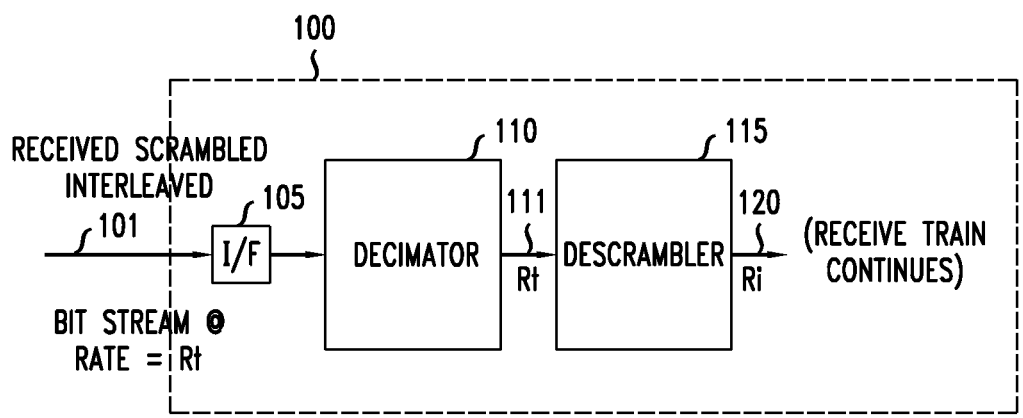
FIG. 4 is a simplified block diagram illustrating selected components of a receiver that is operational according to an embodiment of the present invention.

FIG. 4 is a simplified block diagram illustrating selected components of a receiver 100 operational according to an embodiment of the present invention. In this embodiment, receiver 100 includes a network interface 105 that receives bit interleaved and scrambled bit stream 101. Note that the network interface will vary depending on the transmission medium, and may be essentially the same or similar to the network interface 41 depicted in FIG. 3.

In the embodiment of FIG. 4, the received bit stream 101 is provided by the network interface to decimator 110. Decimator 110 produces a bit stream 111 that carries the bits of the received bit stream 101 that were allocated for receiver 40. Bits not intended for receiver 40 are discarded or ignored. Here it is noted that the operation of decimator 110 may be but is not necessarily the same as the operation of decimator 50 shown in FIG. 3. Allocated bit stream 111 from decimator 110 is then provided to descrambler 115, which is configured according to the present invention.

In this embodiment, descrambler 115 then descrambles only the allocated bit stream 111 provided to it, a process further described below. Notably, while the transmitted bit stream 101 arrives at the receiver 100 at the rate $R_t$, the descrambling process is performed at the much lower rate $R_i$. This is possible because the descrambler 115 only has to descramble the allocated bit stream 111, which is received from decimator 110 at the lower rate. An increase in the efficiency is expected in all or almost all implementations. Note, however, that no particular rate differential or efficiency increase is a requirement of the present invention unless explicitly recited in a particular embodiment. The decimated and descrambled bit stream 120 is then passed along to downstream elements (not shown) of receiver 100 for further processing.

Note that in most implementations, there are multiple receivers of the bit stream 35, in many cases each processing the bit-interleaved and scrambled bit stream in the same fashion. While this is not a requirement, it is preferred, and for convenience the invention will be described herein based on a network in which all receivers are operating according to the same principle.

Figure 2:
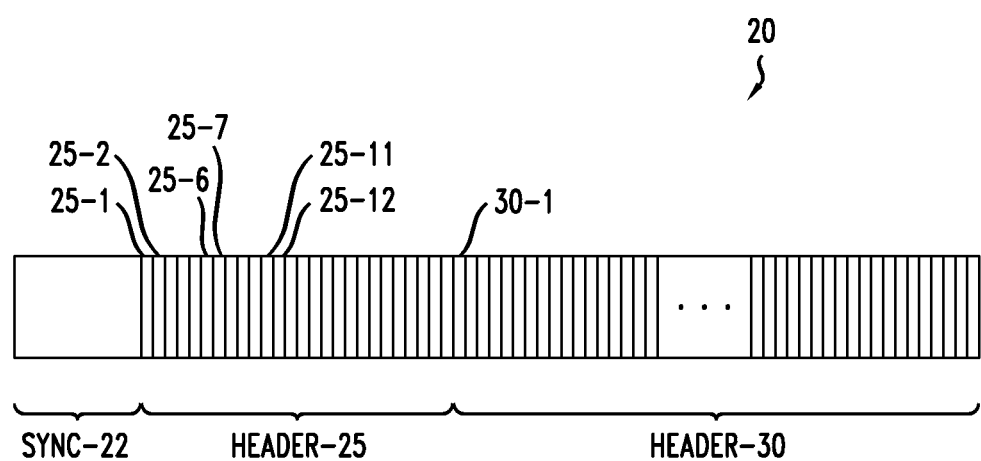
FIG. 2 is an exemplary frame structure illustrating a typical bit-interleaved format.

Some notation may be assigned for use herein. In its general form, a bit-interleaved frame (for example frame 20 shown in FIG. 2) transmitted by the sender carries the traffic for a particular receiver i, where i=1, 2, . . . , N, at every $K_i$ th bit starting at a particular bit position $S_i$ in the frame and ending at a later bit position $T_i$. The triplet $(S_i, T_i, K_i)$ then identifies the location of receiver i's bits as the allocation for receiver i.

Note that the allocation may be static or dynamic. Dynamic allocations can vary every frame or after several frames, and not necessarily in a periodic manner As mentioned above, the header field allocation is typically static and regular, and frequently any dynamic allocation is communicated to the relevant receiver or receivers in the header field of the transmission frame, although other mechanisms may be used. Some manner of ascertaining the allocation is of course necessary for the decimator to properly remove the allocated bits.

In implementing the present invention, it is of course desirable that the decimation and descrambling be done properly. The decimated bit stream must accurately include those bits intended for the receiver performing the decimation. As mentioned above this can be assured by allotment information that is either agreed upon in advance or extracted from the transmitted frames themselves, normally from the header portion.

Descrambling after the decimation may be successfully performed by processing the bit stream in a number of different ways, several of which will now be described as separate embodiments. The desirability of each of these embodiments may vary according to factors such as whether the data frame payload allotment is static or dynamic and the selection of the allocation interval $K_i$.

Note that all mathematical operations described herein are over the binary field unless stated otherwise or clear from the context.

First Embodiment

In a first embodiment, a modified (interleaved, scrambled) bit stream is transmitted by the sending device and received by the receiver, for example at interface 105 of receiver 100 shown in FIG. 4. A configuration and operation of the receiver descrambler for this embodiment will now be described.

Figure 5:
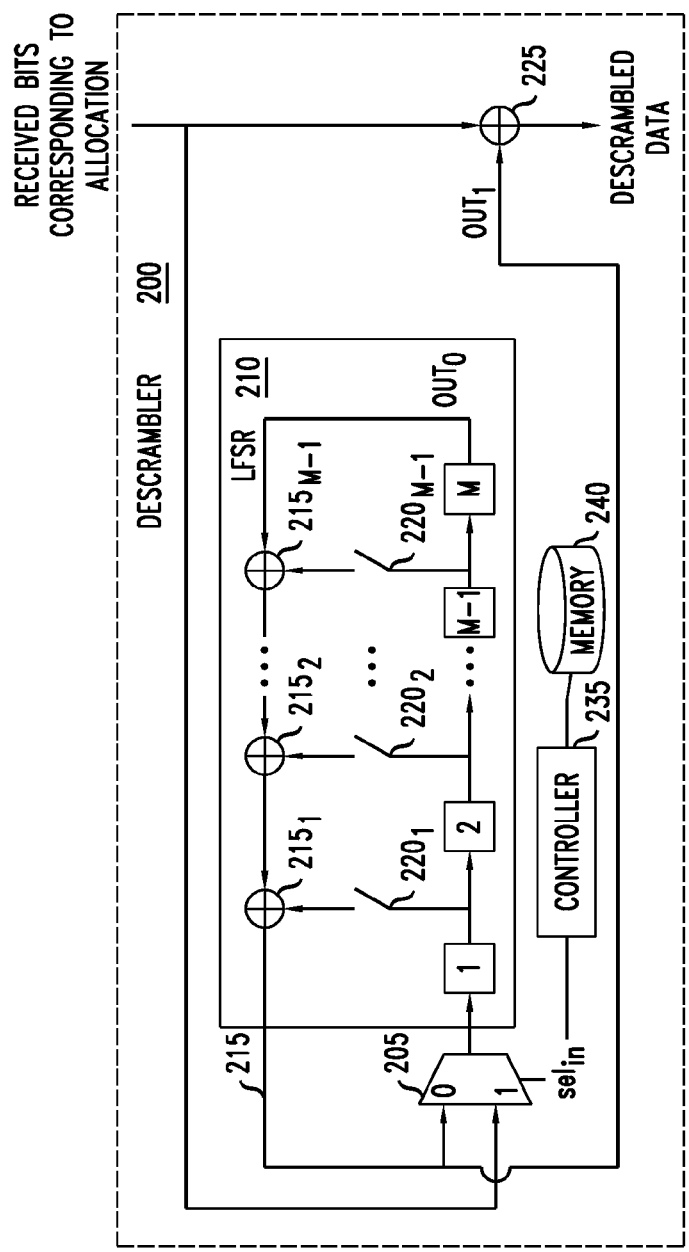
FIG. 5 is a schematic diagram illustrating a descrambler according to an embodiment of the present invention.

FIG. 5 is a schematic diagram illustrating a descrambler 200 according to an embodiment of the present invention. In this embodiment, the descrambler 200 receives the allocated bit stream and outputs the descrambled data, as noted in FIG. 5 (refer also to FIG. 4). Descrambler 200 includes an LFSR 210 having m registers (referred to here as 1, 2 . . . m−1, m). As indicated by the ellipsis, there may be any number of such registers in a given descrambler; as an example, a GPON system may use 8 though for XGPON designs the number may go as high as 58. The number of registers will usually correspond to the number of registers in the scrambling LFSR, though as should be apparent a receiver could be constructed with extra components that could be switched into or out of service to adjust for different values of m.

In the embodiment of FIG. 5, XOR gates $215_1$, $215_2$, . . . $215_{m-1}$ are serially provided in the feedback loop 215. As can be seen, in this embodiment there is a tap (or potential tap) following each register in LFSR 210, and a switch $220_1$, $220_2$, . . . $220_{m-1}$, for activating the associated tap and in so doing providing a second input to an XOR gate. (The first input of the XOR gate being the output of feedback loop 215 at that point.) If there is no second input provided to the XOR gate, the state of the feedback loop is not altered by that XOR gate. In this manner the LFSR can be configured as needed, preferably when the receiver is authorized or registered with the receiver, as appropriate to the environment. In other embodiments (not shown), the receiver may be fabricated for only one scrambling polynomial configuration, or at least have more limited configuration flexibility than is represented in FIG. 5. There is certainly no requirement that taps and XOR gates be present if they are not needed for a particular implementation.

Note that the PRBS generated by the sending device (see FIG. 1) is normally generated by an LFSR characterized by a polynomial, and the LFSR of the receiver will normally be characterized in the same or some complimentary fashion.

In the embodiment of FIG. 5, descrambler also includes an input selector 205 that determines the input to the (first register of the) LFSR 210. Input selector 205 selects the input from one of two possible sources at the direction of a control signal $sel_{in}$. The first source, or input 0, is the feedback loop 215 of the LFSR 210. The second source, or input 1, is the allocated bit stream as it is received at the descrambler 200 (typically from the decimator). A controller 235 may be used to control the selector according to data and program instructions stored in memory device 240. Note that controller 235 and memory 240 need not be physically located in the descrambler 200 and may control the operation of other receiver components (not shown) as well.

Note that as used herein, "memory" and "memory device" refer to physical data storage device that is non-transitory in the sense of being not merely a propagating signal.

Finally, in this embodiment descrambler 200 includes an output XOR gate adder 225 for combining the output of the LFSR 210, which is feedback loop 215, with the allocated bit stream as it is received at the descrambler 200. The output of XOR gate 225 is the descrambled allocated bit stream, which is provided to the remainder of the receive train (not shown) of the receiver. Operation of the descrambler 200 will now be explained.

Figure 6:
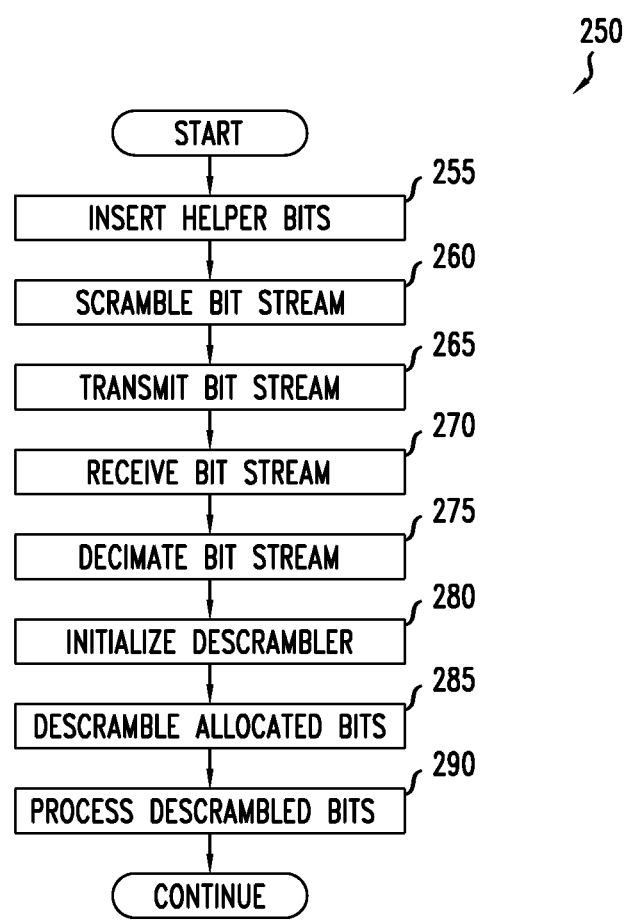
FIG. 6 is a flow diagram illustrating a method according to this embodiment of the present invention.

FIG. 6 is a flow diagram illustrating a method 250 according to this embodiment of the present invention. Note that this method 250 is highly suitable for dynamic allocations. It is again presumed that there exists a mechanism by which the receiver is aware of its allocation for each frame and knows whenever there is a change in its allocation. For instance, this can be accomplished with dedicated header fields where each receiver has a known static header-field allocation.

At START it is presumed that the components necessary for performing method 250 are available and operation according to this embodiment. In addition, it is presumed that the sender has the capability to insert additional bits in the transmission to each receiver. These additional bits, referred to herein as helper bits, are used to assist the receiver in determining the appropriate initial state for the LFSR in the descrambler. Since dynamic allocations are often used for the payload sections of the frame, the sender would be expected in many cases to have this capability. Note that the effective throughput to the receiver is not greatly affected as usually only a small number of additional bits are needed.

The process then begins with the insertion of helper bits (step 255) into the interleaved frame (or during the interleaving process). Presuming that an m-bit LFSR is used at the scrambler of the sending device (and descrambler of the receiver), the sending device inserts m bits with value 0 at the beginning of the payload for each receiver. To be specific, these m bits are inserted exactly in the allocation for each receiver i, that is, at intervals of $K_i$ bits starting at position $S_i$. In this embodiment, helper bits are inserted in the payload for all receivers in every transmitted frame. This bit-interleaved frame is then provided to the scrambler for scrambling (step 260), and the scrambled bit stream is then transmitted (step 265).

In the embodiment of FIG. 6, the scrambled bit stream with helper bits included in the interleaved frame is received (step 270) at the receiver. In accordance with the present invention, the received bit stream is then provided to a decimator where it is decimated (step 275) to produce the allocated bit stream for the receiver, which in this embodiment includes at the beginning of the inserted m helper bits.

In this embodiment, when the payload section of a frame of the allocated bit stream is received in the descrambler, it is first used to initialize the LFSR. This can be accomplished, for example, by operation (not separately shown) of an input selector, such as the input selector 205 shown in FIG. 5. If the input selector is controlled to select the input 1 for m clock cycles, then the first m bits of the allocated bit stream payload, the helper bits, are loaded into registers 1 through m of LFSR 210. After initialization, the input selector 205 is controlled to select input 0, which selects the output of feedback loop 215 for input to register 1. Note that in this embodiment, the initialization step is performed for the payload of every frame.

In the embodiment of FIG. 6, the received allocated bit stream is then descrambled (step 285). Referring again to FIG. 5, this may be done by XOR adding the output of the feedback loop 215 with the allocated bit stream. The descrambled allocated bit stream may then be provided (step 290) to the remainder of the receive chain for further processing (not shown). Note, however, that in this embodiment the first m bits of each frame of the descrambled allocated bit stream (corresponding to the m helper bits) are discarded or ignored.

Note that this first embodiment may be used to advantage when the PRBS generated by the scrambler in the sending unit is an MLS (maximal length sequence) and $K_i$ is a power of 2. It is a property of the PRBS that when $K_i$ is a power of 2, the decimated MLS can be generated using the same LFSR as in the scrambler with an appropriate initialization. This property is applied in a novel manner in the present invention.

For convenience, the properties of this type of PRBS are reviewed here considering an m-bit LFSR where the active taps in the feedback path are determined by the recurrence relationship that the PRBS follows. If $x_0, \ldots, x_{m-1}$ is the first m bits of the PRBS, that is the LFSR registers are initialized as Register $1 = x_{m-1}$, Register $2 = x_{m-2}$, ..., Register $m = x_0$, the recurrence is given by $$x_m = \sum_{j=0}^{m-1} g_j x_j,$$

where $g_j \in \{0, 1\}$.

The recurrence is alternately described by the generator polynomial g(X) given by $$g(X) = \sum_{j=0}^{m} g_j X^j,$$

where $g_m = 1$.

The coefficients $g_j$ determine the active taps. In the embodiment of FIG. 6, when the sender inserts helper bits in a frame, the first m bits arriving at receiver i are exactly the first m bits of the decimated MLS corresponding to receiver i. The first m bits also provide additional information. They give the initial state of the LFSR in order to generate the decimated MLS for receiver i beginning with these m bits.

Again, however, when the helper bits are used to initialize the LFSR, the first m bits of the LFSR output need to be skipped because they are not needed to descramble the received data. So, the LFSR output after the XOR gates in the feedback path is used as it has the same effect of skipping the first m output bits.

Note that for the helper bits, instead of inserting m 0s, the sender can also insert any m-bit string that is also known to the receiver. In this case, the receiver XORs the first m received bits with the known string to obtain the initialization (not shown).

Second Embodiment

The second embodiment is in many respects similar to the first, and may also be used to advantage when the PRBS generated by the scrambler in the sending unit is an MLS (maximal length sequence) and $K_i$ is a power of 2. It is also highly suitable for dynamic payload allocations. This embodiment, however, addresses an implementation where helper bits are inserted in the payload for a receiver i in the current frame only if the dynamic allocation to receiver i changes in the current frame with respect to the previous frame.

Figure 7:
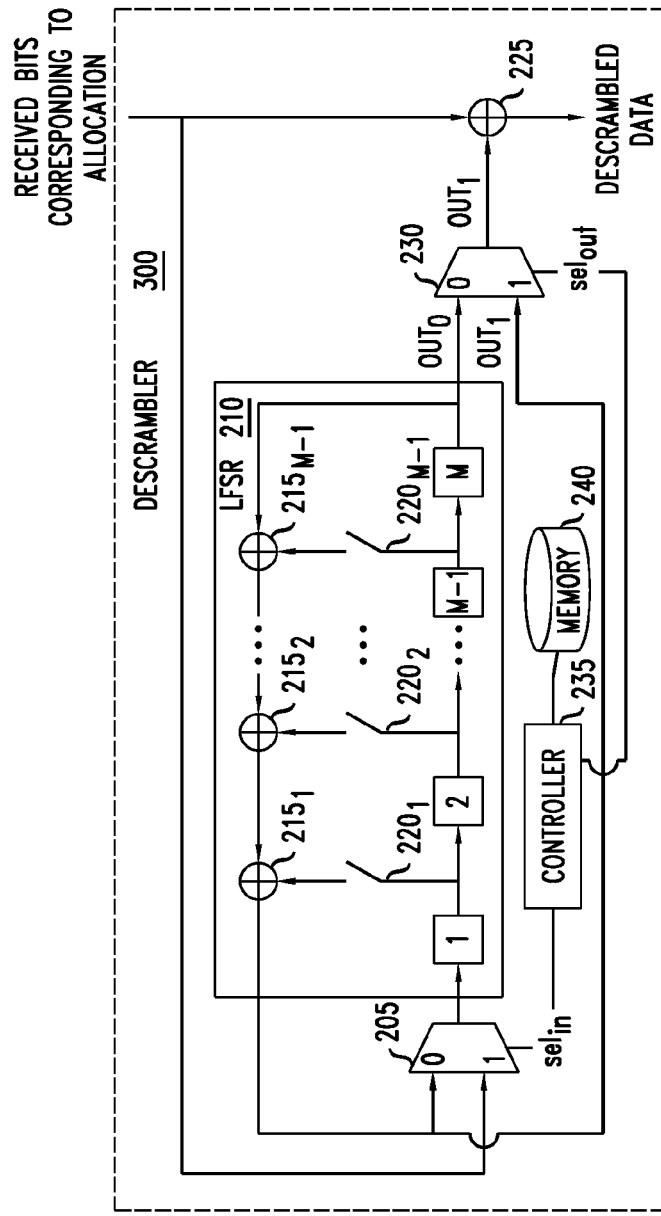
FIG. 7 is a schematic diagram illustrating a descrambler according to another embodiment of the present invention.

FIG. 7 is a schematic diagram illustrating a descrambler 300 according to an embodiment of the present invention. It is noted that the descrambler 300 is similar or identical in many respects to the descrambler 200 shown in FIG. 5. For convenience therefore identical components are numbered identically and are not described again here unless necessary to illustrate the distinctions.

More specifically, the descrambler 300 of FIG. 7 includes, in addition to those common elements depicted in FIG. 5, an output selector 230. Output selector 230 determines the output of LFSR 210 that will be used for descrambling the received allocated bit stream. Output selector 230 selects the output from one of two possible sources at the direction of a control signal $sel_{out}$. The first source, or input 0, is the output of the $m^{th}$ register of LFSR 210, and the second source, or input 1, is the output of feedback loop 215.

The XOR gate adder 225 of FIG. 7 therefore combines the output of output selector 230 with the allocated bit stream as it is received at the descrambler 200. The output of XOR gate 225 is the descrambled allocated bit stream, which is provided to the remainder of the receive train (not shown) of the receiver.

Operation of the descrambler 300 in this embodiment generally follows that shown in FIG. 6, with the following alterations (not shown). At step 255 helper bits are inserted in the payload for receiver i in the current frame only if the dynamic allocation (of the payload) to receiver i changes in the current frame with respect to the previous frame. The input and output selectors are controlled accordingly, as noted in FIG. 7.

Again, it is presumed that the receiver knows its allocation with respect to the payload, for example from the header portion of a frame. It can therefore detect in which frames there is a change in its dynamic (payload) allocation. This is sometimes made even easier by the presence of a dedicated bit in the header to indicate the allocation change.

In this embodiment, when the payload section of a frame of the allocated bit stream is received in the descrambler 300, it is first used to initialize the LFSR only when there has been a change in the allocation. Again, this can be accomplished, for example, by operation (not separately shown) of an input selector, such as the input selector 205 shown in FIG. 7. If the input selector is controlled to select the input 1 for m clock cycles, then the first m bits of the allocated bit stream payload, the helper bits, are loaded into registers 1 through m of LFSR 210. After initialization, the input selector 205 is controlled to select input 0, which selects the output of feedback loop 215 for input to register 1. Note that in this embodiment, the initialization step is performed for the payload of every frame. Controller 235 may be used to control the selectors according to data and program instructions stored in memory device 240. Note that controller 235 and memory 240 need not be physically located in the descrambler 300 and may control the operation of other receiver components (not shown) as well.

Finally, the output sequence of feedback loop 215 is selected by output selector 230 if the dynamic allocation changes in the current frame. As with the embodiment of FIG. 6, the first m bits of the descrambled data for the current frame payload are ignored, but only in this case as they correspond to the helper bits. On the other hand, if there is no change in the dynamic allocation, the output sequence of register m of the LFSR 210 is chosen. Note that where the helper bits are not used to initialize the descrambler, it may be initialized from values stored in memory, for example, using the same initialization values as the previous frame, or according to another method.

Note again that this second embodiment, like the first, may also be used to advantage when the PRBS generated by the scrambler in the sending unit is an MLS (maximal length sequence) and $K_i$ is a power of 2.

Third Embodiment

This embodiment is highly suitable for static allocations. Initially, in this embodiment it is presumed that each receiver i=1, . . . , N has a known static allocation $(S_i, T_i, K_i)$, where $K_i$ is a power of 2, and that the initial state of the LFSR in the scrambler is a fixed and known m-bit sequence. This is true, for example, for some existing standards such as GPON (gigabit PON). Finally, it is presumed that each receiver has an ID (typically in binary format) that is programmed into its hardware. For example, using a simple representation where receiver i has its ID given by i−1 in binary format, each receiver has an ID of length ceil($\log_2$/N) bits. Under these conditions, an efficient descrambler may be configured as follows.

Figure 13:
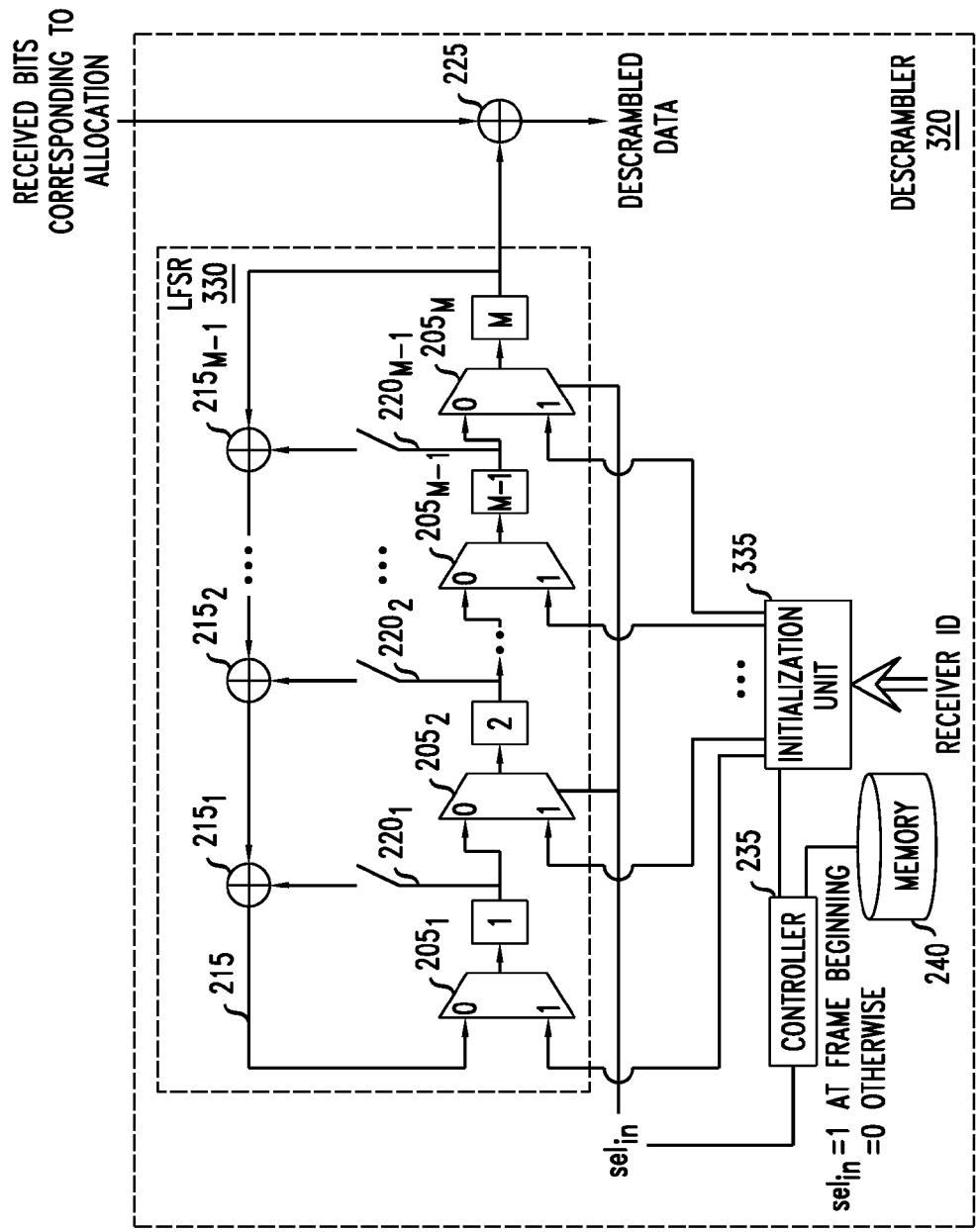
FIG. 13 is a schematic diagram illustrating a descrambler according to another embodiment of the present invention.

Reference is made here to FIG. 13. FIG. 13 is a schematic diagram illustrating a descrambler 320 according to an embodiment of the present invention. It is noted that the descrambler 320 is similar or identical in many respects to the descrambler 200 shown in FIG. 5. For convenience therefore identical components are numbered identically and are not described again here unless necessary to illustrate the distinctions.

More specifically, the descrambler 320 of FIG. 13 includes, in addition to those common elements depicted in FIG. 5, an input selector associated with each register of the LFSR 330. Each input selector 205$_1$ through 205$_m$ may select between one of two inputs. A first input, input 0, selects for input to the associated register the same input as would obtain in, for example, LFSR 210 of FIG. 5. Specifically if input 0 is selected each register receives on the next clock pulse the contents of the preceding register (except Register 1, which receives input from feedback loop 215. The second input, input 1, is from initialization unit 335, the operation of which will be described below. Note that in this embodiment, each input selector 205$_1$ through 205$_m$ is provided with the same sel$_{in}$ control signal at the same time, which is preferably the case. Note also that although each input selector 205$_1$ through 205$_m$ has one input connected to the initialization unit 335, the bit provided to each input selector 205$_1$ through 205$_m$ does not necessarily have the same value.

In this embodiment, some processing is performed initially and offline, that it, before the transmission of interleaved data occurs. Given a scrambling polynomial and its initial state, the following processing is performed offline:

1. The m-bit LFSR used by the scrambler (not shown) is simulated or emulated (for example by executing stored software program instructions) with the given initial state to collect the bits $x_0^{(i)}, \ldots, x_{m-1}^{(i)}$ at positions $S_i$, $S_i+K_i, \ldots, S_i+(m-1)K_i$ respectively from the generated sequence for each receiver i=1, . . . , N. The collected bits $x_0^{(i)}, \ldots, x_{m-1}^{(i)}$ are the first m bits of the decimated MLS corresponding to the allocation of receiver i.

2. An initialization unit, for example initialization unit 335 shown in FIG. 13, which takes the receiver ID as input (typically in binary format) and outputs the first m bits of the decimated MLS corresponding to that receiver (found from step 1, immediately above) is designed. This can be implemented using a look-up table or combinational logic.

In a related embodiment, processing above can alternately be performed mathematically instead of simulation. For each receiver i=1, . . . , N, determine the first m bits $x^{(i)}=x(S_i, K_i)=(x(S_i, K_i)_0, \ldots, x(S_i, K_i)_{m-1})^T$ of the decimated MLS for receiver i by computing $$x^{(i)}=x(S_i, K_i)=H_{S_i,K_i}x, \qquad (8)$$

where $H_{S_i,K_i}$ is an m×m matrix which depends on the starting position $S_i$ and decimation factor $K_i$ and x denotes the first m bits of the original MLS. The matrix $H_{S_i,K_i}$ is calculated as follows. Let α be a root of the polynomial g(X) as in equation (4) (See below, fifth embodiment). Using equation (4), we first compute an expression for $\alpha^{S_i+j \cdot K_i}$, j=0, 1, . . . , m−1, in terms of $\alpha^l$, l=0, 1, . . . , m−1 to obtain $$\alpha^{S_i+jK_i} = \sum_{l=0}^{m-1} h_{j,l}\alpha^l \text{ for } l = 0, 1\ldots, m-1. \qquad (9)$$

Next, obtain $H_{S_i,K_i}$ by taking the jth row of the matrix to contain the entries $h_{j,0}, \ldots h_{j,m-1}$, where the m rows of $H_{S_i,K_i}$ are numbered j=0, 1, . . . , m−1.

Note that in this embodiment, there is no change in the sender operation. It does not need to insert any bits as in embodiments one and two described above. This is very advantageous because static allocations are normally used in header fields where it would either be impossible or would be unreasonable to insert additional bits as headers are relatively very short compared to the payload.

In operation, the receiver descrambler implementation is very similar to the scrambler and uses the same LFSR as in the scrambler. The only difference is in the initialization of the LFSR in the descrambler. Instead of using a fixed m-bit sequence as in the scrambler, the descrambler employs the initialization unit designed during offline processing to find the initial state of the LFSR as shown in FIG. 13.

1. The ID of the receiver is programmed, that is, stored in its hardware, for example in memory 240 shown in FIG. 13 or in another location. The receiver ID is fed as input to initialization unit. The first m bits $x_0, \ldots, x_{m-1}$ of the decimated MLS corresponding to the receiver are obtained as the output.

2. These m bits are used to initialize the LFSR in the descrambler, for example LFSR 330 of descrambler 320. The same initial state is also used for the following frames as the allocation is static.

Thus, after initially powering ON the receiver, the initialization unit does not have any dynamic power consumption once the initial state is determined.

Note also that this third embodiment, like the first two, may also be used to advantage when the PRBS generated by the scrambler in the sending unit is an MLS (maximal length sequence) and $K_i$ is a power of 2.

Fourth Embodiment

This method is highly suitable for static and regular allocations. As described above, a static and regular allocation is a special case of static allocations In this embodiment it is presumed that the decimation factor K for the static-regular allocation is a power of 2, and that the initial state of the LFSR in the scrambler is a fixed and known m-bit sequence as is currently true for some standards such as GPON. Finally, it is presumed that each receiver has an ID (typically in binary format) which is programmed into its hardware. For example, using a simple representation where receiver i has its ID given by i–1 in binary format, each receiver has an ID of length ceil($\log_2 N$) bits. Under these conditions, we can design an efficient descrambler as follows.

In this embodiment, some processing is performed initially and offline, that it, before the transmission of interleaved data occurs. Given a scrambling polynomial and its initial state, the following processing is performed offline:

1. The m-bit LFSR used by the scrambler (not shown) is simulated or emulated (for example, by executing stored software program instructions) to collect the bits $x_0^{(i)}, \ldots, x_{m-1}^{(i)}$ at positions $S_i, S_i+K_i, \ldots, S_i+(m-1)K_i$ respectively from the generated sequence for each receiver $i=1, \ldots, N$. The collected bits $x_0^{(i)}, \ldots, x_{m-1}^{(i)}$ are the first m bits of the decimated MLS corresponding to the allocation of receiver i. Note that, instead of simulation or emulation, this step can also be performed by applying the mathematical equations (8) and (9) as explained above.
2. The m-bit scrambler LFSR is re-initialized to the given initial state. The LFSR is again simulated in software to find for each receiver $i=1, \ldots, N$, the position $p^{(i)}$ in the generated sequence where the m-bit pattern $x_0^{(i)}, \ldots, x_{m-1}^{(i)}$ occurs. Then, the phase shift corresponding to receivers $i=1, \ldots, N$ is computed as $p^{(i)}-1$.
3. A phase shift computation unit (also not shown) which takes the receiver ID as input (typically in binary format), and outputs the phase shift corresponding to that receiver (found from step 2, immediately above) is designed. This can be implemented using a look-up table or combinational logic.

Figure 14:
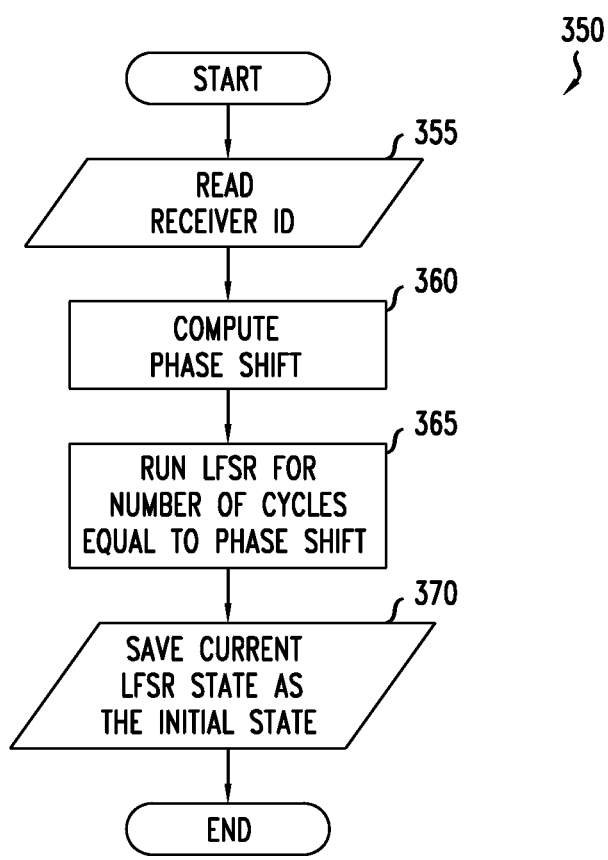
FIG. 14 is a flow diagram illustrating a method according to another embodiment of the present invention.

Note that again in this embodiment, there is no change in the sender operation. It does not need to insert any bits as in embodiments one and two described above. This is very advantageous because static allocations are normally used in header fields where it would either be impossible or would be unreasonable to insert additional bits as headers are relatively very short compared to the payload In operation, the descrambler implementation is similar to the scrambler and uses the same LFSR as in the scrambler. The only difference is in the initialization of the LFSR in the descrambler. Instead of using a fixed m-bit sequence as in the scrambler, the descrambler computes the initial state corresponding to the receiver ID with the help of the phase shift computation unit designed during offline processing. The receiver operation is summarized in the flowchart in FIG. 14. FIG. 14 is a flow diagram illustrating a method 350 according to this embodiment of the present invention. In this embodiment, 1. The ID of the receiver is programmed, that is, stored in its hardware. The receiver ID is fed as input (step 355) to the phase shift computation unit. The phase shift of the decimated MLS corresponding to the receiver with respect to the original MLS (from the scrambler) is obtained as the output (step 360).
2. The LFSR in the descrambler is initialized to the fixed and known m-bit sequence used by the scrambler. The LFSR is then run for a number of cycles (step 365) equal to the phase shift. The state of the LFSR after so many cycles is then saved (step 370). Note that steps 1 and 2 as described here are performed only once after turning ON the receiver (and not for every frame).
3. The saved LFSR state is used as the initial state (not shown in FIG. 14) in the descrambler for every frame. Since the allocation is static, the initialization remains the same for all frames.

Note that there may be a delay in running the descrambler for a number of cycles equal to the phase shift (that is, step 365 of FIG. 14, which is step 2 immediately above). For this reason immediately after powering ON the receiver, typically the first received frame (or the first few frames in the worst-case) may be lost. Fortunately, this is not a big concern as this computation does not need to be repeated while the receiver is ON. Note also that the method of this embodiment can also be used in combination with the fifth embodiment described below. Specifically, it is possible to shorten the delay in step 2 (immediately above; step 365 of FIG. 14) by using a scrambling method that skips states (such as in embodiment 5, below). Using such an approach, the scrambler can skip states to quickly compute the state of the LFSR after the number of cycles given by the phase shift.

It is noted that the third and fourth embodiments are similar. It would be expected that the third embodiment has lower power consumption than this one (the fourth embodiment). However, this embodiment may potentially have an area benefit compared with the third embodiment if it is designed intelligently. The initial state of the scrambler, for example, can be picked intelligently so as to make the phase shift computation unit very simple. This can be accomplished by a simple trial and error method where the preprocessing steps are repeated for different scrambler initial states until a simple relationship between the receiver ID and phase shift is found. This is illustrated below. In this case, since the phase shift computation is simple and the remaining part of the initialization is accomplished using the same LFSR, there can be a potential savings in chip area.

The following examples 1 and 2 illustrate some sample results from the preprocessing stage. In the examples below, the starting position $S_i=i$ and the receiver ID is i–1 for each of the receivers $i=1, \ldots, N$. The decimation factor K is the same as the number of receivers N. The phase shift corresponding to each receiver ID is computed using software simulations. These results are then used to derive a mathematical relationship between the phase shift and receiver ID. This mathematical formula can then be used to design the phase shift computation unit.

EXAMPLE 1

Figure 8:
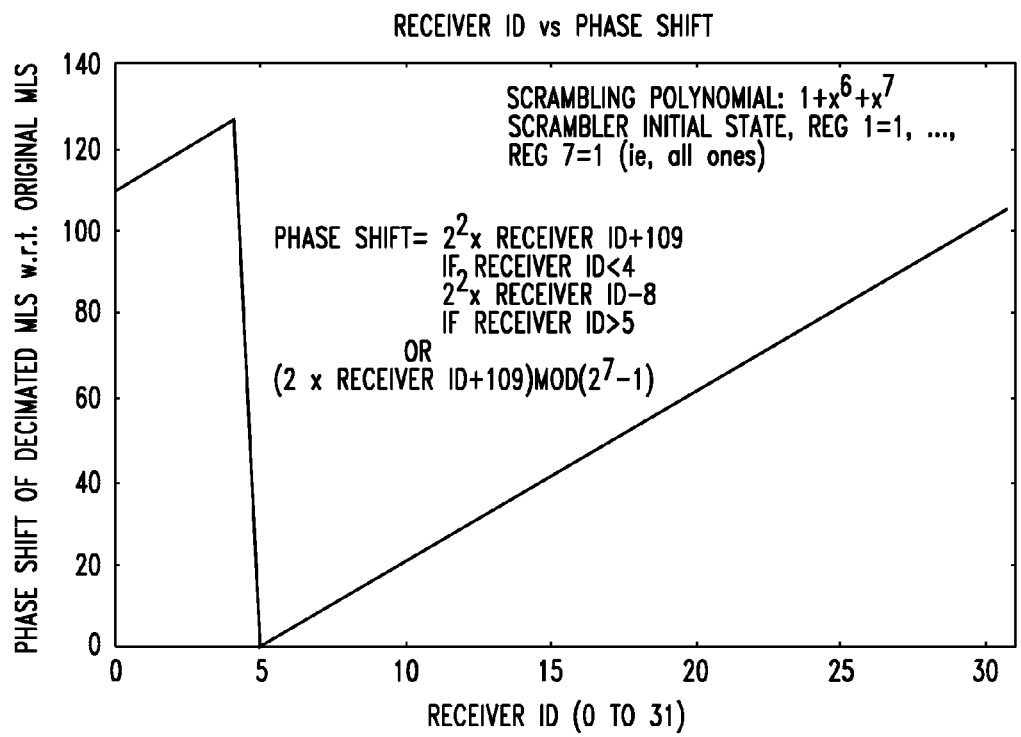
FIG. 8 is a phase shift graph illustrating the phase shift corresponding to certain receiver IDs depending on an LFSR initial state and characterizing polynomial as explained in Example 1.

Presume that $N=K=32$ and the scrambling polynomial (i.e., the polynomial which specifies the length and taps of the LFSR used by the scrambler) is $1+x^6+x^7$. Note that this is the same scrambling polynomial that is used by GPON. If the initial state of the scrambler is all 1s, i.e., Register 1=1, . . . , Register 7=1, as specified by GPON, then the corresponding relationship between the receiver ID and the phase shift is given in FIG. 8. Observe that this is a piece-wise linear relationship and it can be described mathematically in several ways. For example, we can use either Phase shift=$2^2$×Receiver ID+109 if Receiver ID<=4, $2^2$×Receiver ID−18 if Receiver ID>=5, or Phase shift=($2^2$×Receiver ID+109) mod ($2^7$−1), to describe the relationship in FIG. 8. Depending on the hardware resources available, one of these may be simpler to implement than the other.

Figure 9:
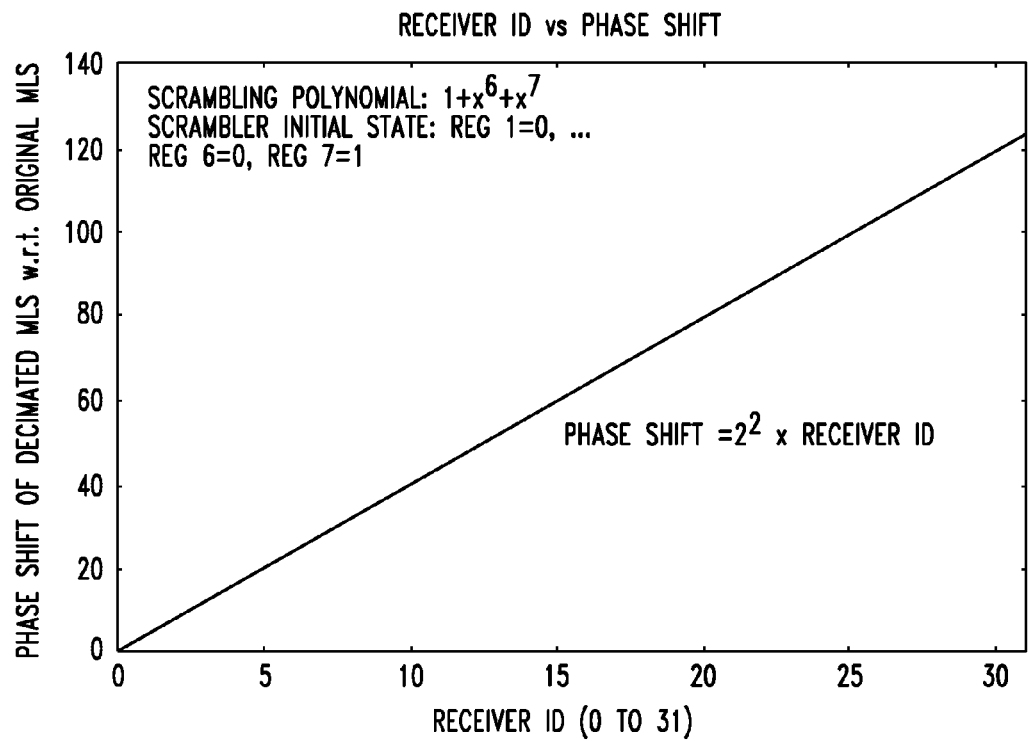
FIG. 9 is a phase shift graph illustrating the phase shift corresponding to certain receiver IDs depending on an LFSR initial state and characterizing polynomial as explained in Example 1.

On the other hand, by experimenting with different initial states for the scrambler, we can find a much simpler relationship between the receiver ID and phase shift. If the scrambler initial state is set as [0, 0, . . . , 0, 1], i.e., Register 1=0, Register 2=0, . . . , Register 7=1, then the corresponding relationship between the receiver ID and the phase shift is given in FIG. 9. Observe that this is a simple linear relationship and it can be easily described mathematically as Phase shift=$2^2$×Receiver ID.

The multiplication of the receiver ID by a power of 2 can be easily implemented in hardware by a simple left shift operation. Therefore, we obtain a very simple implementation of the phase shift computation unit.

EXAMPLE 2

Figure 10:
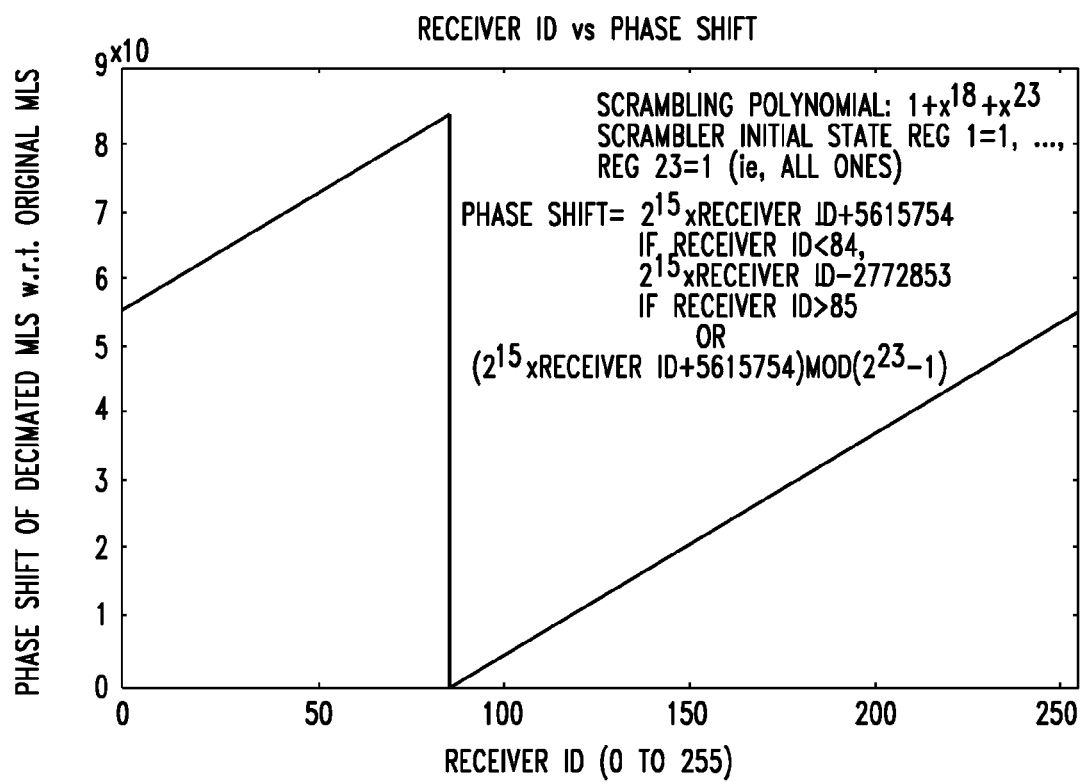
FIG. 10 is a phase shift graph illustrating the phase shift corresponding to certain receiver IDs depending on an LFSR initial state and characterizing polynomial as explained in Example 2.

Suppose that N=K=256 and the scrambling polynomial (i.e., the polynomial which specifies the length and taps of the LFSR used by the scrambler) is $1+x^{18}+x^{23}$. If the initial state of the scrambler is all 1s, i.e., Register 1=1, . . . , Register 23=1, then the corresponding relationship between the receiver ID and the phase shift is given in FIG. 10. Observe that this is a piece-wise linear relationship and it can be described mathematically in several ways. For example, we can use either Phase shift=$2^{15}$×Receiver ID+5615754 if Receiver ID<=84, $2^{15}$×Receiver ID−2772853 if Receiver ID>=85, or Phase shift=($2^2$×Receiver ID+109) mod ($2^7$−1), to describe the relationship in FIG. 10. Depending on the hardware resources available, one of these may be simpler to implement than the other.

Figure 11:
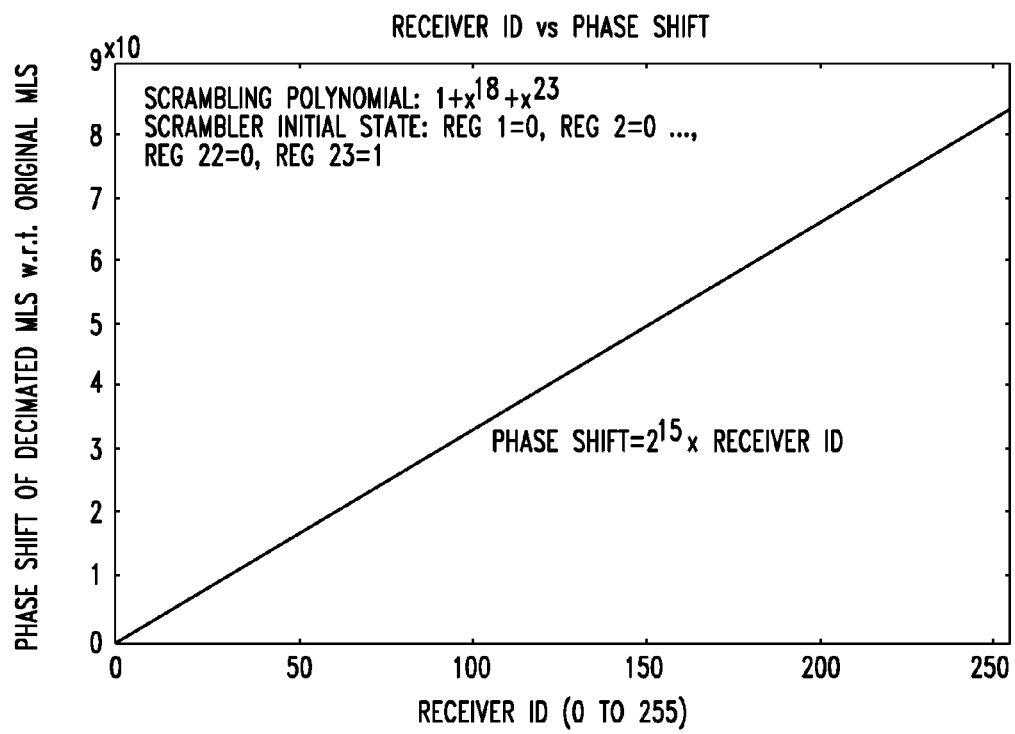
FIG. 11 is a phase shift graph illustrating the phase shift corresponding to certain receiver IDs depending on an LFSR initial state and characterizing polynomial as explained in Example 2.

On the other hand, by experimenting with different initial states for the scrambler, we can find a much simpler relationship between the receiver ID and phase shift. If the scrambler initial state is set as [0, 0, . . . , 0, 1], i.e., Register 1=0, Register 2=0, . . . , Register 23=1, then the corresponding relationship between the receiver ID and the phase shift is given in FIG. 11. Observe that this is a simple linear relationship and it can be easily described mathematically as Phase shift=$2^{15}$×Receiver ID.

The multiplication of the receiver ID by a power of 2 can be easily implemented in hardware by a simple left shift operation. Therefore, we obtain a very simple implementation of the phase shift computation unit.

Note that if the initial state of the scrambler is not fixed, then the method of the fourth embodiment may be modified at the cost of some additional complexity. In the offline processing stage, simulations or emulations can be used to design a phase shift computation unit that takes both the receiver ID and the scrambler initial state as inputs, and outputs the phase shift of the decimated MLS corresponding to the receiver and scrambler initialization.

Finally, note that in this fourth embodiment, to compute the initialization the phase shift corresponding to each receiver is computed in preprocessing, that is, offline. Once the phase shift is known, the correct initialization to generate the decimated MLS can be found by using the scrambler initial state in the LFSR and running the LFSR for a number of cycles equal to the phase shift. Using the LFSR state after so many cycles as the initial state at the descrambler, we generate the same MLS with the correct phase shift, i.e., we generate exactly the decimated MLS as needed. This embodiment is suitable for implementations where the decimation factor K for all receivers is a power of 2, since the decimated MLS in this case for each receiver is the same as the original MLS except for a phase shift. Therefore, the decimated MLS can be generated using the same LFSR as in the scrambler with an appropriate initialization.

Fifth Embodiment

As background for this embodiment and the two that follow, recall that the descrambling methods previously described may be used where (a) the PRBS used by the scrambler is a maximal length sequence (MLS); and (b) at any receiver i where the decimation factor $K_i$ is a power of 2.

Although these conditions are inherently true in many situations, or the system may be designed such that they are true, there remains the possibility that we can be forced to a situation where at least one of the above conditions is not true. The method proposed in this embodiment does not impose or rely on any of these above conditions (a) or (b). This advantage, however, comes at the price of relatively higher complexity. Furthermore, the method of this embodiment may be used in combination with the previously described fourth embodiment.

The state of the descrambler is given by the vector r=($r_m$, . . . $r_1$) where $r_i$ is the bit value stored in register i. Indeed, given the state is r, the first m bits generated by the LFSR are exactly ($x_0$, . . . , $x_{m-1}$)=($r_m$, . . . , $r_1$).

Figure 12:
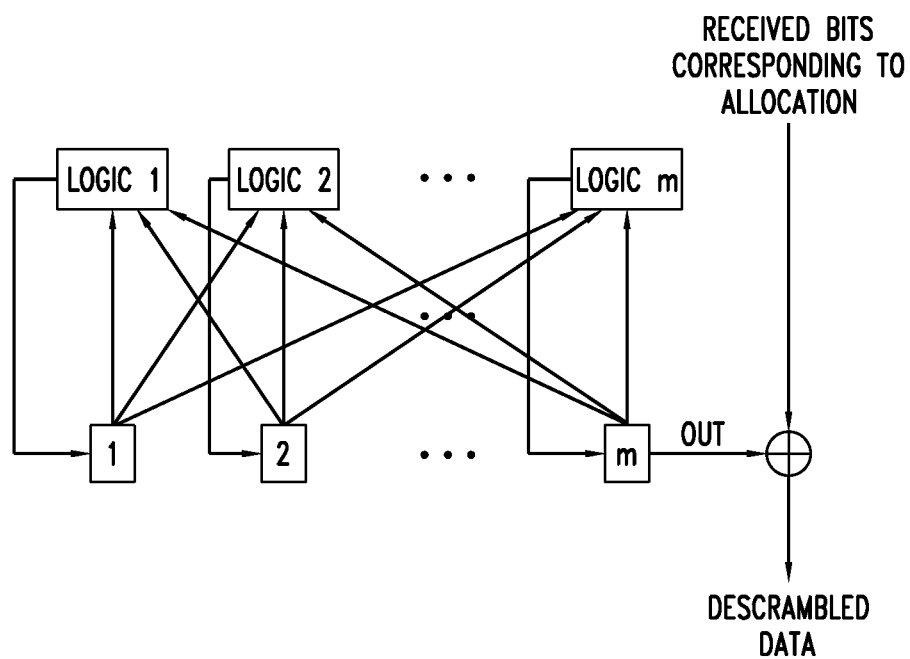
FIG. 12 is a schematic diagram illustrating a general implementation of a skipping descrambler according to an embodiment the present invention.

First, a method is described to implement a descrambler that skips a fixed number S states ahead from the current state (with respect to the original LFSR in the scrambler) during each clock cycle. Note that S is not necessarily a power of 2, and the LFSR used in the scrambler can generate any PRBS, which is not necessarily an MLS. The general implementation of the skipping descrambler is shown in FIG. 12. As should be apparent, each of the Logic units 1 though m respectively updates individual registers 1 through m after processing information collected from each register. The logic used for determining the descrambler state S cycles ahead from the current state is found using the following offline processing steps.

1. Take the original m-bit LFSR used by the scrambler. For each of the initial states $e_1$, . . . , $e_m$, where $e_i$ is the initial state where register i is 1 and the remaining registers are 0, the m-bit state $r(e_i, S)=(r_m(e_i, S), \ldots, r_1(e_i, S))$ of the descrambler after S cycles is found using simulation or emulation.

2. The transfer function/matrix for computing the descrambler state S cycles ahead as a function of its current state is obtained as follows:

$$C_S = \begin{bmatrix} r_m(e_m, S) & r_m(e_{m-1}, S) & \ldots & r_m(e_1, S) \\ r_{m-1}(e_m, S) & r_{m-1}(e_{m-1}, S) & \ldots & r_{m-1}(e_1, S) \\ \vdots & \ddots & \ddots & \vdots \\ r_1(e_m, S) & r_1(e_{m-1}, S) & \ldots & r_1(e_1, S) \end{bmatrix}.$$

Consequently, if the current state of the descrambler is $r = (r_m, \ldots, r_1)^T$, the new descrambler state $r' = (r'_m, \ldots, r'_1)^T$ after S cycles can be obtained as $$r' = C_S r.$$

3. The logic for implementing the state skipping is then determined from $C_S$. Such implementation is possible in several ways. As an example, the new descrambler state $r' = (r'_m, \ldots, r'_1)^T$ after S cycles from the current state $r = (r_m, \ldots, r_1)^T$ can be computed as follows:

$$r'_i = \bigoplus_{\substack{j=1,\ldots,m: \\ c_{i,m-j+1}=1}} r_j,$$

$$i = 1, \ldots, m,$$

where $c_{ij}$, with $i, j = 1, \ldots, m$, is the entry in $C_S$ in row i and column j.

Note that the matrix $C_S$ in step 2 above can alternately be calculated mathematically using equations (2) and (5) of the following:

It is possible to compute the special cases: (a) $x(S, 1)$ i.e., the first m bits of the MLS starting at position S and taking every bit (i.e., no decimation) of the original MLS; and (b) $x(0, K)$ i.e., the first m bits of the MLS that is decimated by factor K starting from the first bit. The equations have the following structure:

$$x(S, 1) = C_S x, \quad (2)$$

$$x(0, K) = D_K x, \quad (3)$$

where $C_S$ and $D_K$ are m×m matrices which depend on the starting position S and decimation factor K respectively. The matrices $C_S$ and $D_K$ are calculated as follows. Let $\alpha$ be a root of the polynomial $g(X)$. Then, we have $$\alpha^m = \sum_{j=0}^{m-1} g_j \alpha^j. \quad (4)$$

To compute $C_S$: First, we use equation (4) to compute an expression for $\alpha^{S+j}$, $j = 0, 1, \ldots, m-1$, in terms of $\alpha^l$, $l = 0, 1, \ldots, m-1$ to obtain $$\alpha^{S+j} = \sum_{l=0}^{m-1} c_{j,l} \alpha^l \text{ for } j = 0, 1, \ldots, m-1. \quad (5)$$

Further, $C_S$ may be obtained by taking the jth row of the matrix to contain the entries $c_{j,0}, \ldots, c_{j,m-1}$, where the m rows of $C_S$ are numbered $j = 0, 1, \ldots, m-1$.

And to compute $D_K$: First, use equation (4) to compute an expression for $\alpha^{jK}$, $j = 0, 1, \ldots, m-1$, in terms of $\alpha^l$, $l = 0, 1, \ldots, m-1$ to obtain $$\alpha^{jK} = \sum_{l=0}^{m-1} d_{j,l} \alpha^l \text{ for } j = 0, 1, \ldots, m-1. \quad (6)$$

Next, obtain $D_K$ by taking the jth row of the matrix to contain the entries $d_{j,0}, \ldots, d_{j,m-1}$, where the m rows of $D_K$ are numbered $j = 0, 1, \ldots, m-1$.

Also note the following. If the recurrence relation for the LFSR is given by construct the m×m matrix G as follows:

$$G = \begin{bmatrix} 0_{m-1} & I_{m-1} \\ \hline g_0 & g_1 & \ldots & g_{m-1} \end{bmatrix},$$

where $0_{m-1}$ is the column vector with m−1 zeros and $I_{m-1}$ is the (m−1)×(m−1) identity matrix. Then, $C_S$ can also be computed using the relation $$C_S = G^S.$$

Sixth Embodiment

This embodiment is related to the fifth, described above. The method proposed in this embodiment does not impose or rely on the conditions (a) the PRBS used by the scrambler is a maximal length sequence (MLS); or (b) where the decimation factor $K_i$ is a power of 2. This advantage, however, again comes at the price of relatively higher complexity. Furthermore, the method of this embodiment may be used in combination with the previously described fourth and fifth embodiments.

The state of the descrambler is again given by the vector $r = (r_m, \ldots r_1)$ where $r_i$ is the bit value stored in register i. Indeed, given the state is r, the first m bits generated by the LFSR are exactly $(x_0, \ldots, x_{m-1}) = (r_m, \ldots, r_1)$.

In this embodiment a method is proposed for skipping a variable number of cycles ahead. Initially, presume the descrambler required to skip a variable number S states ahead from the current state. Suppose that S can be any value that is at most $S_{max}$ (given). The trivial way is of course to implement the logic for fixed skipping for each S that is at most $S_{max}$ and use one of them as desired. The method of this embodiment is believed to be more efficient and is proposed below.

Figure 15:
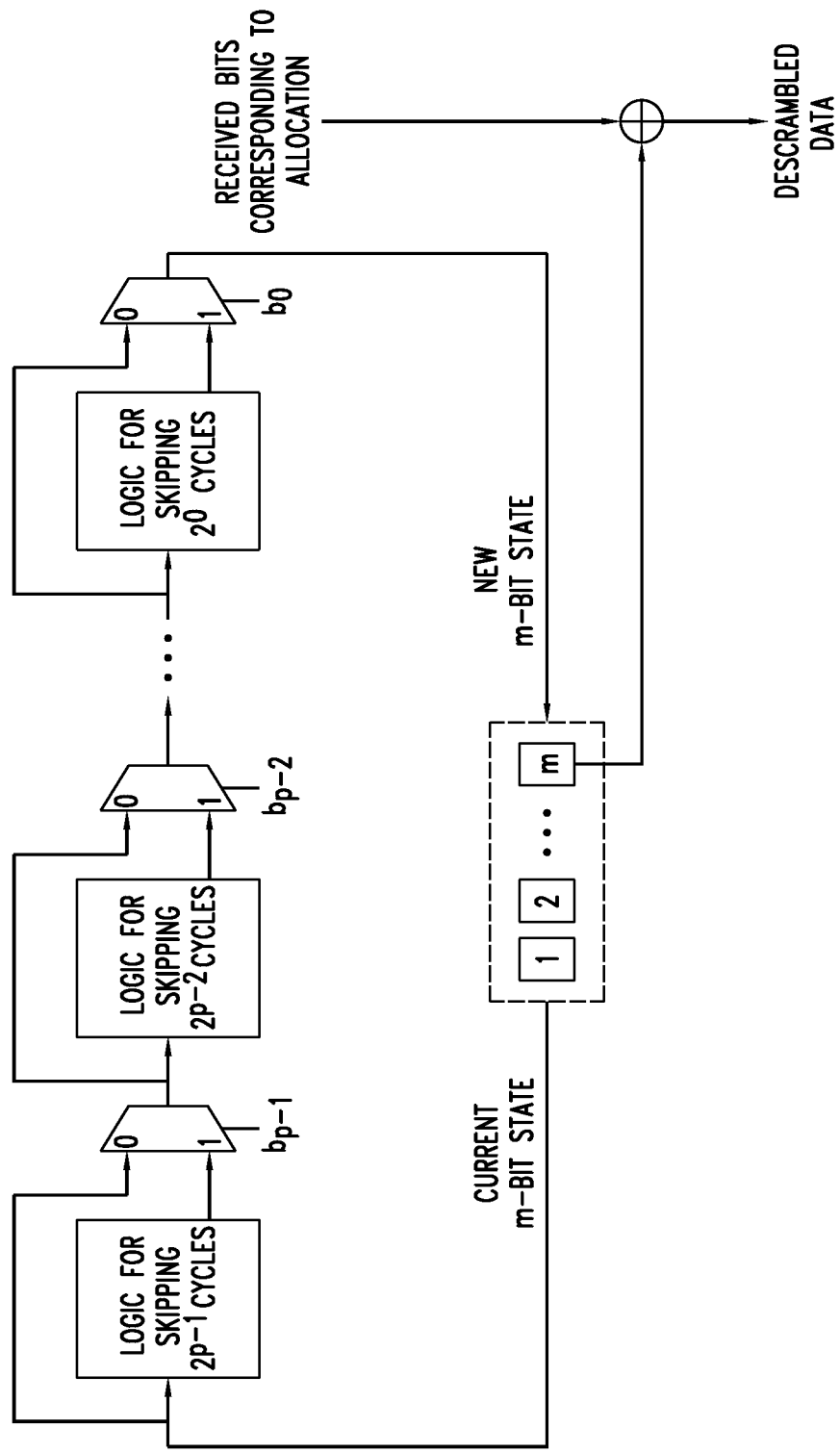
FIG. 15 is a schematic diagram illustrating a descrambler according to another embodiment of the present invention.

1. The number of bits to represent $S_{max}$ in binary format is computed as $p = \text{ceil}(\log_2(S_{max}+1))$.
2. The logic for skipping a fixed number of cycles ahead is implemented for every $S' = 2^i$, where $i = 0, 1, 2, \ldots, p-1$. This logic may be based on the fifth embodiment, above, but can be based on other schemes as well.
3. In order to skip S cycles ahead, where S is at most $S_{max}$, a combination of the fixed skipping logic in step 2 are cascaded as needed. This is achieved by taking the binary representation of S and cascading the logic corresponding to $S' = 2^i$ if the bit position i (with least significant bit having position 0) in the binary representation of S is 1. This is shown in FIG. 15. FIG. 15 is a schematic that illustrates a descrambler that skips states by a variable number $S=(b_{p-1}, b_{p-2}, \ldots b_0)$ of cycles ahead, where $(b_{p-1}, b_{p-2}, \ldots b_0)$ denotes the binary representation of S.

As an example, presume $S_{max}=250$. Then, $p=\text{ceil}(\log_2(251))=8$. In this case, the logic for skipping 1, 2, $2^2$, ..., $2^7$ cycles are each implemented. Suppose we wish to skip S=200 cycles ahead at some point. The binary representation for 200 is given by 11001000. So, skipping 200 cycles ahead is accomplished by cascading the logic for skipping ahead by $2^7$, $2^6$ and $2^3$ cycles.

Note that minor variations of steps 2 and 3, immediately above, are possible. For example, instead of implementing the logic skipping for $2^i$ cycles separately, this can also be done by skipping $2^{i-1}$ cycles twice. Other variations are possible based on the decomposition property (see equation 11, below; eighth embodiment), as will be explained below in further detail.

Seventh Embodiment

This embodiment is related to the fifth and sixth, described above. The method proposed in this embodiment does not impose or rely on the conditions (a) the PRBS used by the scrambler is a maximal length sequence (MLS); or (b) where the decimation factor $K_i$ is a power of 2. This advantage, however, again comes at the price of relatively higher complexity. Furthermore, the method of this embodiment may be used in combination with the previously described fourth, fifth, and sixth embodiments.

The state of the descrambler is again given by the vector $r=(r_m, \ldots r_1)$ where $r_i$ is the bit value stored in register i. Indeed, given the state is r, the first m bits generated by the LFSR are exactly $(x_0, \ldots, x_{m-1})=(r_m, \ldots, r_1)$.

In this embodiment a method is proposed for descrambling bit-interleaved traffic. Initially, suppose the allocation for receiver i is $(S_i, T_i, K_i)$. In order to produce the bits for descrambling receiver i's allocation, use the method for skipping a variable number of cycles as follows:

1. The registers are initialized to the original initial state used by the scrambler.
2. As outlined in the sixth embodiment, the logic for skipping a fixed number of cycles ahead is implemented for every $S'=2^i$, where $i=0, 1, 2, \ldots, p-1$. We can set $S_{max}$ for example as $S_{max}=\max(S_i, K_1, \ldots, S_N, K_N)$.
3. The logic to skip ahead by $S_i$ cycles is activated once (by cascading) to obtain the initial state corresponding to receiver i. This initial state is stored and is used directly for future frames. For static allocations, this computation is done only once. For dynamic allocations, the initial state is updated whenever there is a change in $S_i$.
4. After initializing to the state corresponding to $S_i$, the logic to skip ahead by $K_i$ cycles is activated continuously (by cascading) to produce the bits needed to descramble the traffic obtained by receiver i. See FIG. 15.

Eighth Embodiment

As background to the eighth embodiment, suppose an m-bit LFSR is used in the scrambler and consider a receiver i with allocation $(S_i, T_i, K_i)$ where $K_i$ is a power of 2. In order to produce the decimated MLS corresponding to receiver i using the same LFSR, it needs to be initialized appropriately.

The appropriate initialization of the LFSR is given by the first m bits $x(S_i, K_i)=(x(S_i, K_i)_0, \ldots, x(S_i, K_i)_{m-1})^T$ of the decimated MLS for receiver i. This can be mathematically computed as $x(S_i, K_i)$ using equations (8) and (9), above. These computations depend on the allocation parameters $S_i$, $K_i$, but it is manageable if the allocations are static. However, if $S_i$ and $K_i$ vary dynamically, a practical method to perform the computations is desirable.

Figure 16:
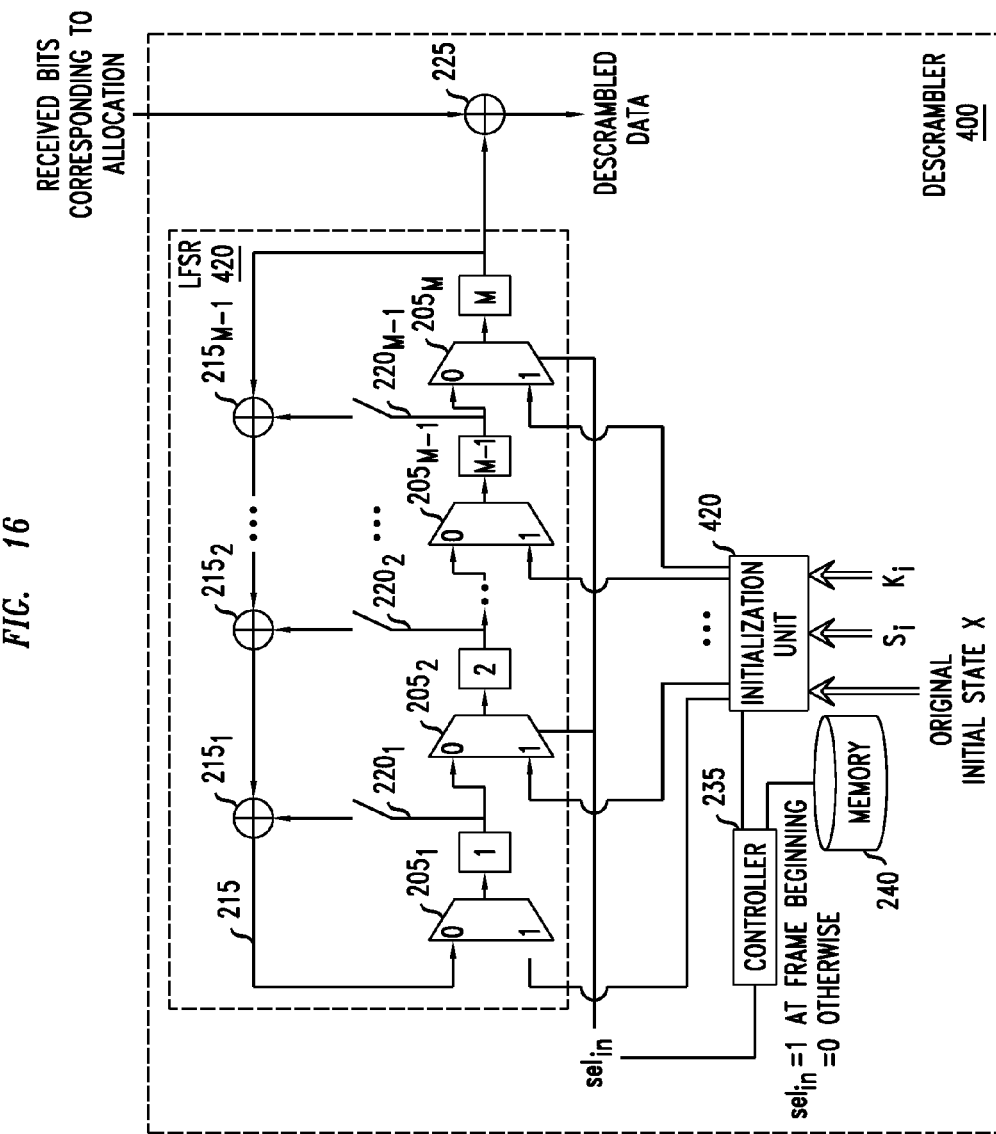
FIG. 16 is a schematic diagram illustrating a descrambler according to another embodiment of the present invention.

This embodiment outlines how such an initialization unit can be designed for dynamic allocations. The function of the initialization unit in a descrambler according to this embodiment is shown in FIG. 16. FIG. 16 is a schematic diagram illustrating a descrambler 400 according to an embodiment of the present invention. It is noted that the descrambler 400 is similar or identical in many respects to the descrambler 330 shown in FIG. 13. For convenience therefore identical components are numbered identically and are not described again here unless necessary to illustrate the distinctions. In the embodiment of FIG. 16, initialization unit 420 takes the original initial state (corresponding to the first m bits x of the original MLS), $S_i$ and $K_i$ as inputs, and outputs the appropriate initialization to produce the decimated MLS.

First, observe that the following property is true:

$$x(S_i, K_i)=H_{S_i,K_i}x=D_{K_i}C_{S_i}x, \qquad (10)$$

where $D_{Ki}$ and $C_{Si}$ are determined by equations (2)-(6). This is because $x'=C_{Si} x$ provides the first m bits of the MLS starting at position $S_i$. Now, considering the MLS starting with x' (i.e., at position $S_i$ of the original MLS), computing $D_{Ki}$ x' provides the first m bits of the MLS decimated by factor $K_i$. Thus, equation (10) provides a decomposition of the computation where $C_{Si}$ accounts for skipping the first $S_i$ positions and $D_{Ki}$ accounts for the decimation by factor $K_i$.

In general, the logic for multiplying a binary m×m matrix A by a binary vector $x=(x_0, \ldots, x_{m-1})^T$ $$x'=A\ x$$

is simple to implement and this is possible in several ways. As an example $$x'_i = \bigoplus_{\substack{j=1,\ldots,m: \\ a_{i,j}=1}} x_j,$$

$$i = 1, \ldots, m,$$

where $a_{ij}$, with $i,j=1, \ldots, m$, is the entry in A in row i and column j. The main problem in the implementation of equation (10) is that $S_i$ and $K_i$ can vary.

Now, in order to support varying values of $S_i$, the ideas described in embodiment six, above, can be used. Presume that $S_i$ can be any value that is at most $S_{max}$ and $p=\text{ceil}(\log_2(S_{max}+1))$. The logic for skipping a fixed number of cycles (i.e., positions in the original MLS) ahead is implemented for every $S'=2^i$, where $i=0, 1, 2, \ldots, p-1$. This logic may be based on the fifth embodiment, above, but can be based on other schemes as well. In order to skip $S_i=(b_{p-1}, b_{p-2}, \ldots, b_0)$ cycles ahead, where $(b_{p-1}, b_{p-2}, \ldots, b_0)$ denotes the binary representation of $S_i$, a combination of the fixed skipping logic are cascaded as needed. Specifically, the logic corresponding to skipping $S'=2^i$ cycles is cascaded if $b_i=1$.

The decomposition of $S_i$ to support varying values using its binary representation as described above is quite convenient especially in hardware. More generally, the decomposition is based on the following basic property:

If $S_i=a+b$, then $C_{Si}=C_a \cdot C_b$ where a, b are positive integers. (11)

Based on this property, there are several possible decompositions, one of which may suit the particular application. For example, the logic for skipping a fixed number of cycles can be implemented for $S'=10^i$, for $i=0, 1, 2, \ldots$. Then, in order to skip, say $S_i=154$ cycles, we call the logic for skipping $S'=10^2$, $10^1$, $10^0$ cycles once, five times, and four times respectively in a cascade manner.

In order to support varying values of $K_i$, we use the following decomposition property which holds when $K_i$ is a power of 2:

$$\text{If } K_i = a \cdot b \text{ with } a=2^{a'} \text{ and } b=2^{b'}, \text{ then } D_{Ki}=D_a \cdot D_b. \qquad (12)$$

Thus, in the simplest implementation, it is only necessary to realize the logic for $D_2$, i.e, decimation by factor 2. Then, decimation by any $K_i=2^k$ can be realized by calling the logic for $D_2$ in a cascade manner for k times since $D_{2^k}=(D_2)^k$. In a more sophisticated implementation, the decimation logic for $D_{K'}$ where $K'=2^x$, $2^y$, $2^z$, ... can be implemented. Then, in order to decimate by factor $K_1=2^{x+y+z}$, we cascade the logic for decimation by $K'=2^x$, $2^y$ and $2^z$; to decimate by factor $K_2=2^{x+y}$, we cascade the logic for decimation by $K'=2^x$ and $2^y$; and so on.

Figure 17:
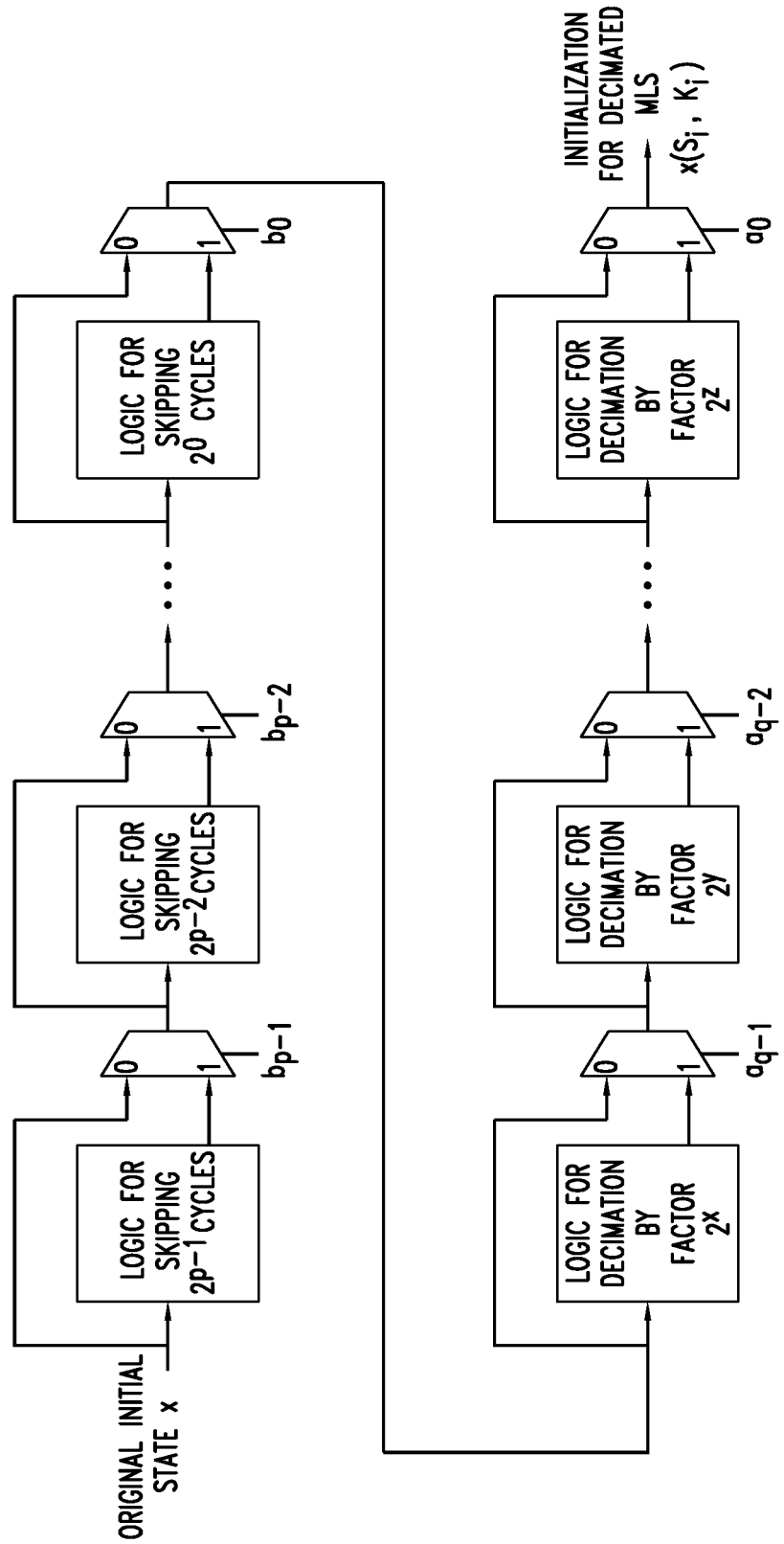
FIG. 17 is a schematic diagram illustrating an initialization unit according to another embodiment of the present invention.

To summarize, the initialization unit of the descrambler operates in the following steps, which is also illustrated in FIG. 17. FIG. 17 illustrates an initialization unit for dynamic allocation where where $S_i$ is represented in binary by $(b_{p-1}, \ldots, b_0)$ and $a_{q-1}, \ldots, a_0$ are binary values such that $K_i = (2^x)^{\wedge}a_{q-1} \cdot (2^y)^{\wedge}a_{q-2} \ldots (2^z)^{\wedge}a_0$.

1. Based on the decomposition property (11), the logic for skipping a fixed number of cycles ahead is implemented for different values of S' as determined by the application scenario.
2. Based on the decomposition property (12), the logic for decimation by K' is implemented for different values of K' (which are powers of 2) as determined by the application scenario.
3. Start with the original initial state (corresponding to the first m bits x of the original MLS) which is used by the scrambler and is also known to the receiver.
4. The logic to skip ahead by $S_i$ cycles is first activated (by cascading) using the property (11) as explained above.
5. The logic for decimation by factor $K_i$ is then activated (by cascading) using the property (12) as explained above.
6. The final m bits obtained as the output is the initial state corresponding to receiver i. This initial state is stored and is used directly for future frames. For static allocations, this computation is done only once. For dynamic allocations, whenever there is a change in $S_i$ or $K_i$, we go back to step 3 and re-calculate the appropriate initial state.

Finally, the m bits output from the initialization unit are used to initialize the LFSR (which is the same as in the scrambler) to produce exactly the decimated MLS required for descrambling the data.

Note that the sequences of operation illustrated in the drawings and explained herein by reference to them represent exemplary embodiments; some variation is possible within the spirit of the invention. For example, additional operations may be added to those shown, and in some implementations one or more of the illustrated operations may be omitted. In addition, the operations of the method may be performed in any logically-consistent order unless a definite sequence is recited in a particular embodiment. The same is true for the skipping logic and the decimating logic illustrated in the drawings, for example FIGS. 15 and 17, and explained in the Specification.

Although multiple embodiments of the present invention have been illustrated in the accompanying Drawings and described in the foregoing Detailed Description, it should be understood that the present invention is not limited to the disclosed embodiments, but is capable of numerous rearrangements, modifications and substitutions without departing from the invention as set forth and defined by the following claims. For example, consider a sender that broadcasts the same information to all N receivers. Note that all N receivers are interested in the same information in this example. So, a broadcast scheme rather than a multiplexing scheme is used. Suppose the sender broadcasts at a high rate of, say, 10 Gbps. Further, suppose that some of the receivers can handle only smaller rates of reception, say, 1 Gbps, 2.5 Gbps etc. In this case, each such receiver obtains a set of intermittent bits from the original transmission at a rate corresponding to the receiver's limit. Once again, the receiver is faced with the problem of descrambling a set of intermittent bits. Our techniques will be applicable in this situation too.

The invention claimed is:

1. A communication system comprising a first receiver, the first receiver comprising:
   a network interface for receiving a scrambled bit stream interleaved to include bits allocated for the first receiver and bits allocated for at least a second receiver;
   a extractor downstream of the network interface configured to extract from the interleaved bit stream only bits allocated for the first receiver; and
   a descrambler downstream of the extractor for descrambling the allocated bits extracted from the interleaved bit stream.

2. The communication system of claim 1, further comprising a transmitter, the transmitter comprising a bit stream scrambler.

3. The communication system of claim 2, wherein the bit stream scrambler comprises an m-bit LFSR (linear feedback shift register).

4. The communication system of claim 1, wherein the first receiver is an ONU.

5. The communication system of claim 1, wherein the first receiver is a wireless device.

6. The communication system of claim 1, wherein the descrambler comprises an m-bit LFSR having a feedback loop comprising at least one XOR gate adder having as a first input the output of the $m^{th}$ register of the LFSR and having as a second input an LFSR tap positioned between the first register of the LFSR and the $m^{th}$ register of the LFSR.

7. The communication system of claim 6, wherein the at least one XOR gate adder comprises a plurality of XOR gate adders in series, each XOR gate adder having as a second input an LFSR tap positioned between the first register of the LFSR and the $m^{th}$ register of the LFSR.

8. The communication system of claim 6, wherein the received interleaved bit stream has been scrambled using a PRBS (pseudo-random binary sequence) characterized by an MLS (maximum length sequence).

9. The communication system of claim 8, wherein the LFSR comprises an input selector having as a first input the output of the feedback loop and as a second input the extracted bit stream from the decimator, wherein input selector selects the input to the first register of the LFSR.

10. The communication system of claim 9, wherein the input selector is configured to select the second input for the first m bits of the extracted bit stream corresponding to a data frame and to select the first input otherwise.

11. The communication system of claim 10, wherein the descrambler further comprises an output XOR gate adder having as a first input the output of the feedback loop and as a second input the allocated bit stream from the decimator, wherein the output of the output XOR gate adder is the descrambled data.

12. The communication system of claim 11, wherein the descrambler further comprises:
an output selector having as a first input the output of the $m^{th}$ register of the LFSR and having as a second input the output of the feedback loop; and as a second input the allocated bit stream from the decimator, wherein the output of the output of the output selector is provided to the output XOR gate adder.

13. The communication system of claim 1, further comprising an initialization unit.

14. The communication system of claim 13, further comprising a plurality of input selectors, each input selector having as a first input the output of a preceding register of the LFSR and having as a second input an output of the initialization unit.

15. The communication system of claim 1, further comprising a phase shift computation unit.

16. A method of processing bit-interleaved traffic in a communication system, comprising:
receiving at a first receiver a scrambled bit stream interleaved to include bits allocated for the first receiver and bits allocated for at least a second receiver;
extracting by the first receiver from the interleaved bit stream only bits allocated for the first receiver; and
descrambling the allocated bits extracted from the interleaved bit stream.

17. The method of claim 16, wherein the received interleaved bit stream has been scrambled using a PRBS characterized by an MLS. wherein the received interleaved bit stream has been scrambled using a PRBS (pseudo-random binary sequence) characterized by an MLS (maximum length sequence).

18. The method of claim 17, wherein the descrambler comprises an m-bit LFSR and further comprising initializing the LFSR.

19. The method of claim 18, wherein the bit stream comprises helper bits and initializing the LFSR comprises loading the bits of the received allocation corresponding to the helper bits into the LFSR registers.

20. The method of claim 18, wherein initializing the LFSR comprises loading bits from an initialization unit.

21. The method of claim 16, further comprising discarding by the receiver received bit-stream bits not allocated for the first receiver.

22. The method of claim 16, further comprising interleaving, by a transmitter, a plurality of receiver bit streams to form the interleaved bit stream, scrambling the interleaved bit stream, and transmitting the scrambled interleaved bit stream.

* * * * *